US012298741B2

(12) United States Patent
Frank et al.

(10) Patent No.: US 12,298,741 B2
(45) Date of Patent: May 13, 2025

(54) METHODS AND SYSTEMS FOR USING DUTY CYCLE OF SENSORS TO DETERMINE SEED OR PARTICLE FLOW RATE

(71) Applicant: Precision Planting LLC, Tremont, IL (US)

(72) Inventors: William Frank, Tremont, IL (US); Chad E. Plattner, Tremont, IL (US); Michael Strnad, Tremont, IL (US); Tanner Gray, Green Valley, IL (US)

(73) Assignee: PRECISION PLANTING LLC, Tremont, IL (US)

( * ) Notice: Subject to any disclaimer, the term of this patent is extended or adjusted under 35 U.S.C. 154(b) by 524 days.

(21) Appl. No.: 17/594,679

(22) PCT Filed: Apr. 23, 2020

(86) PCT No.: PCT/IB2020/053849
§ 371 (c)(1),
(2) Date: Oct. 26, 2021

(87) PCT Pub. No.: WO2020/240301
PCT Pub. Date: Dec. 3, 2020

(65) Prior Publication Data
US 2022/0197256 A1    Jun. 23, 2022

Related U.S. Application Data

(60) Provisional application No. 62/855,052, filed on May 31, 2019.

(51) Int. Cl.
*G05B 19/416* (2006.01)

(52) U.S. Cl.
CPC ............ *G05B 19/4166* (2013.01); *G05B 2219/37371* (2013.01)

(58) Field of Classification Search
CPC ......... A01C 7/081; A01C 7/084; A01C 7/102; A01C 7/105; G01F 1/661; G01F 1/662;
(Continued)

(56) References Cited

U.S. PATENT DOCUMENTS 4,307,390 A    12/1981    Steffen et al.
5,969,340 A    10/1999    Dragne et al.
(Continued)

FOREIGN PATENT DOCUMENTS

DE    3889531 T2    11/1994
EP    0988779 A1    3/2000
(Continued)

OTHER PUBLICATIONS

UK Intellectual Property Office, Search Report for related UK Application No. GBI910424.9, dated Jan. 20, 2020.
(Continued)

*Primary Examiner* — Mohamed Charioui
*Assistant Examiner* — Dacthang P Ngo

(57) ABSTRACT

In one embodiment, an electronic system comprises a display device to display data and processing logic coupled to the display device. The processing logic is configured to determine a duty cycle of at least one sensor for sensing flow of a product or particle through a product or particle line of an agricultural implement and to determine an amount of product or particles flowing through a line of the agricultural implement based on the duty cycle of the at least one sensor.

27 Claims, 17 Drawing Sheets

(58) Field of Classification Search
CPC . G01F 1/663; G01F 1/708; G01F 1/74; G01F 15/005; G01F 25/10; G05B 19/4166; G05B 2219/37371; G05B 19/416
See application file for complete search history.

(56) References Cited

U.S. PATENT DOCUMENTS

| | | | |
|---|---|---|---|
| 6,070,539 | A | 6/2000 | Flamme et al. |
| 6,091,997 | A | 7/2000 | Flamme et al. |
| 6,093,926 | A | 7/2000 | Mertins et al. |
| 6,208,255 | B1 | 3/2001 | Conrad et al. |
| 8,078,367 | B2 | 12/2011 | Sauder et al. |
| 8,371,240 | B2* | 2/2013 | Wollenhaupt ........ A01C 21/005 111/185 |
| 8,386,137 | B2 | 2/2013 | Sauder et al. |
| 9,955,625 | B2 | 5/2018 | Baurer et al. |
| 2003/0159633 | A1 | 8/2003 | Upadhyaya et al. |
| 2008/0265141 | A1 | 10/2008 | Leuenberger et al. |
| 2010/0269470 | A1 | 10/2010 | Price |
| 2012/0036914 | A1 | 2/2012 | Landphair et al. |
| 2013/0124055 | A1* | 5/2013 | Baurer .................. H04L 5/0053 701/461 |
| 2014/0191857 | A1 | 7/2014 | Sauder et al. |
| 2015/0059626 | A1* | 3/2015 | Conrad ............... A01M 9/0092 111/120 |
| 2015/0094916 | A1 | 4/2015 | Bauerer et al. |
| 2016/0143211 | A1 | 5/2016 | Baker |
| 2017/0055437 | A1 | 3/2017 | Thompson |
| 2018/0014456 | A1* | 1/2018 | Conrad .................. A01C 7/102 |
| 2018/0184578 | A1 | 7/2018 | Stuber |
| 2019/0232304 | A1 | 8/2019 | Grimm et al. |
| 2019/0289780 | A1 | 9/2019 | Wonderlich et al. |
| 2020/0037598 | A1* | 2/2020 | Wonderlich ........ A01M 7/0089 |
| 2020/0296882 | A1* | 9/2020 | Madison ................ A01C 7/206 |
| 2021/0267118 | A1 | 9/2021 | Plattner |

FOREIGN PATENT DOCUMENTS

| | | |
|---|---|---|
| EP | 3462828 A1 | 4/2019 |
| KR | 101780683 B1 | 9/2017 |
| WO | 2017/197274 A1 | 11/2017 |
| WO | 2018/204196 A1 | 11/2018 |
| WO | 2019/070617 A1 | 4/2019 |
| WO | 2019/099748 A1 | 5/2019 |
| WO | 2019/169369 A1 | 9/2019 |

OTHER PUBLICATIONS

European Patent Office, International Search Report for International Application No. PCT/IB2020/053849, mail date Jun. 8, 2020.
Instituto Nacional De La Propiedad Industrial, Search Report for related Application No. AR20200101355, mailed Feb. 14, 2025, 16 pages.
Plaza et al. "Sensores ópticos de flujo de semilla", revista Agraria '13, Feb. 9, 2013, 10 pages.

\* cited by examiner

METHODS AND SYSTEMS FOR USING DUTY CYCLE OF SENSORS TO DETERMINE SEED OR PARTICLE FLOW RATE

TECHNICAL FIELD

Embodiments of the present disclosure relate to methods and systems for using duty cycle of sensors to determine seed or particle flow rate.

BACKGROUND

Air seeders have a primary distribution system and a secondary distribution system. Seeds and optionally fertilizer are fed from hoppers into the primary distribution system and are conveyed by air to the secondary distribution system. A manifold between the primary distribution system and the secondary distribution system divides the feed so that the secondary distribution system delivers seeds/fertilizer to each row. Seeds/fertilizer are conveyed by air.

Seed or fertilizer sensors on agricultural equipment have typically been optical sensors. When a particle (seed or fertilizer) passes through the optical sensor a light beam is broken and a particle is then detected. The frequency of these particle detections can be used to determine planting populations if the frequency is low enough. However, for higher flow crops like wheat or fertilizer, typical optical sensors sizes of 25 mm or 32 mm do not have a large enough cross sectional area to sense individual particles, therefore making the particle counts from these sensors unreliable and inaccurate.

BRIEF DESCRIPTION OF THE DRAWINGS

The present disclosure is illustrated by way of example, and not by way of limitation, in the figures of the accompanying drawings and in which.

BRIEF SUMMARY

In one embodiment, an electronic system comprises a display device to display data and processing logic coupled to the display device. The processing logic is configured to determine a duty cycle of at least one sensor for sensing flow of a product or particle through a product or particle line of an agricultural implement and to determine an amount of product or particles flowing through a line of the agricultural implement based on the duty cycle of the at least one sensor.

DETAILED DESCRIPTION

All references cited herein are hereby incorporated by reference in their entireties. However, in the event of a conflict between a definition in the present disclosure and one in a cited reference, the present disclosure controls.

Figure 1:
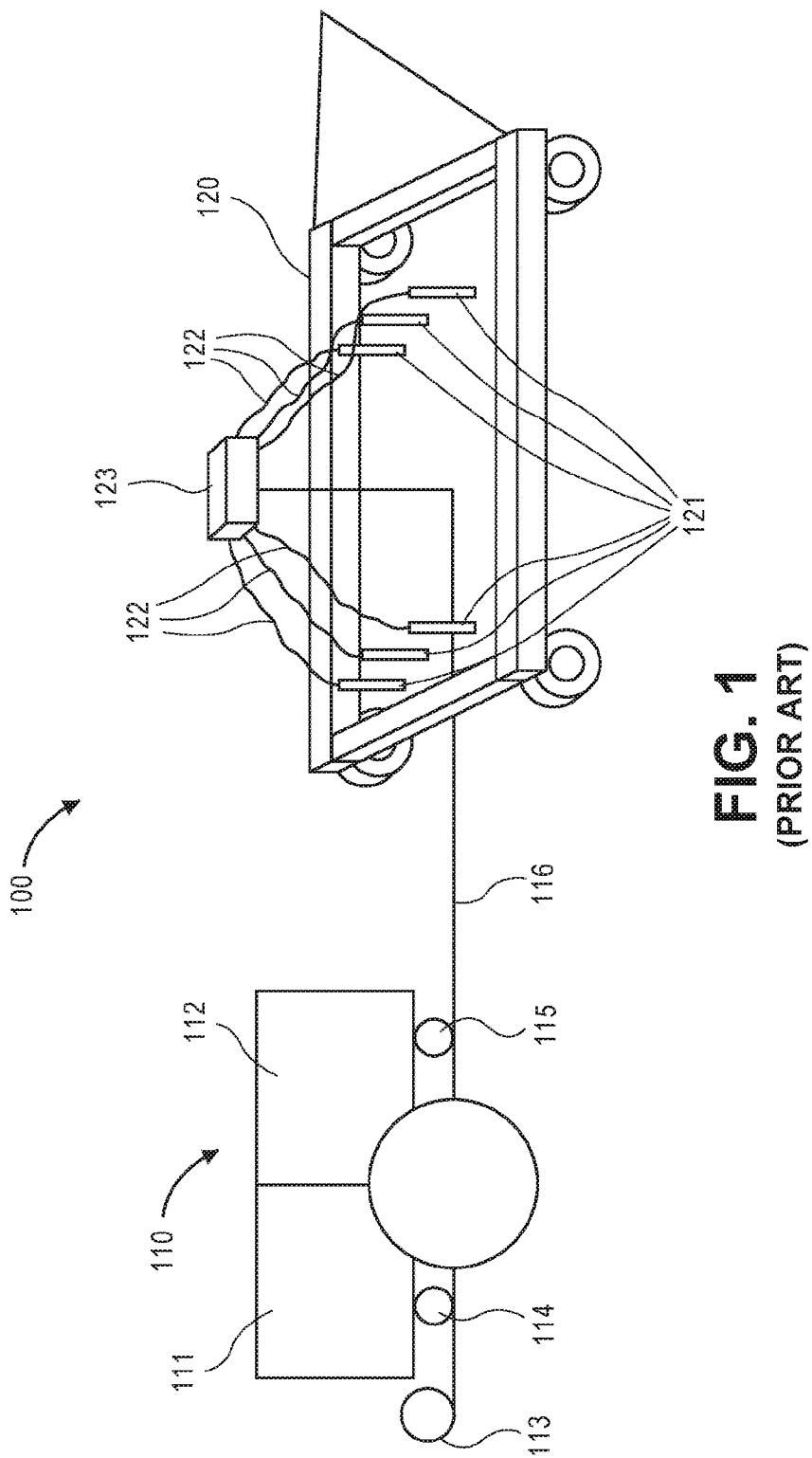
FIG. 1 illustrates a prior art air seeder.

FIG. 1 illustrates a typical air seeder 100. Air seeder 100 includes a cart 110 and frame 120. Cart 110 has hopper 111 and hopper 112 for storing seed and fertilizer, respectively. A main product line 116 is connected to a fan 113 for conveying seed and fertilizer conveyed from meter 114 and meter 115, respectively. Main product line 116 feeds seed and fertilizer to manifold tower 123. Seed and fertilizer are distributed through manifold tower 123 to secondary product lines 122 to openers 121.

While the description below is for control of the manifold tower 123 of one section of an air seeder 100, the same system can be applied to each section.

Figure 2:
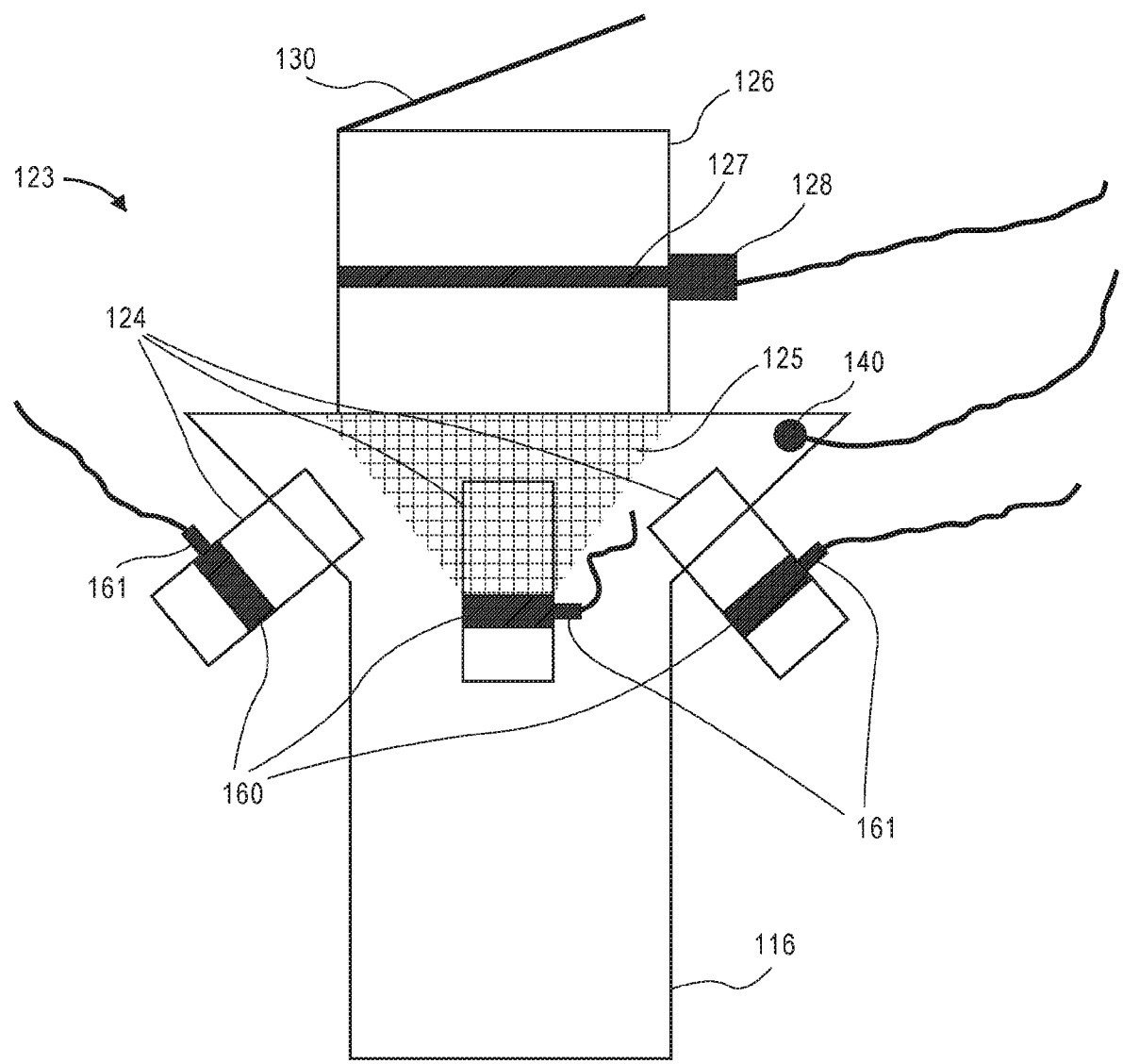
FIG. 2 illustrates an air seeder tower having a vent valve and an actuator for the valve according to one embodiment.

FIG. 2 illustrates manifold tower 123. Manifold tower 123 has main product line 116 providing seed and optionally fertilizer in a flow of air. Seed/fertilizer impact screen 125, which has a mesh size to prevent passage of seed and/or fertilizer. Seeds/fertilizer fall into outlets 124 (or exit ports) and feed into secondary product lines 122. Above screen 125 is a tower 126 which contains a valve 127. Valve 127 can be any type of valve that can be actuated. In one embodiment, valve 127 is a butterfly valve. Valve 127 is actuated by actuator 128, which is disposed on tower 126. Actuator 128 is in signal contact with electrical control system 300. Optionally, a lid 130 is pivotably attached to tower 126 to cover tower 126 when no air is flowing. When air is flowing, lid 130 raises by the force of air flowing through tower 126, and when air is not flowing, lid 130 closes tower 126.

In one embodiment, which is illustrated in FIG. 2, manifold tower 123 further includes a pressure sensor 140 disposed in the manifold tower 123. In another embodiment, pressure sensor 140 is disposed in at least one secondary product line 122. Pressure sensor 140 is in signal communication with electrical control system 300. This can provide a closed loop feedback control of valve 127. In another embodiment, electrical control system 300 measures the pressure at pressure sensor 140 in the manifold tower 123 and the pressure sensor 140 in the secondary product line 122 and calculates a difference between each pressure sensor. Electrical control system 300 can control based on the pressure difference.

Figure 3:
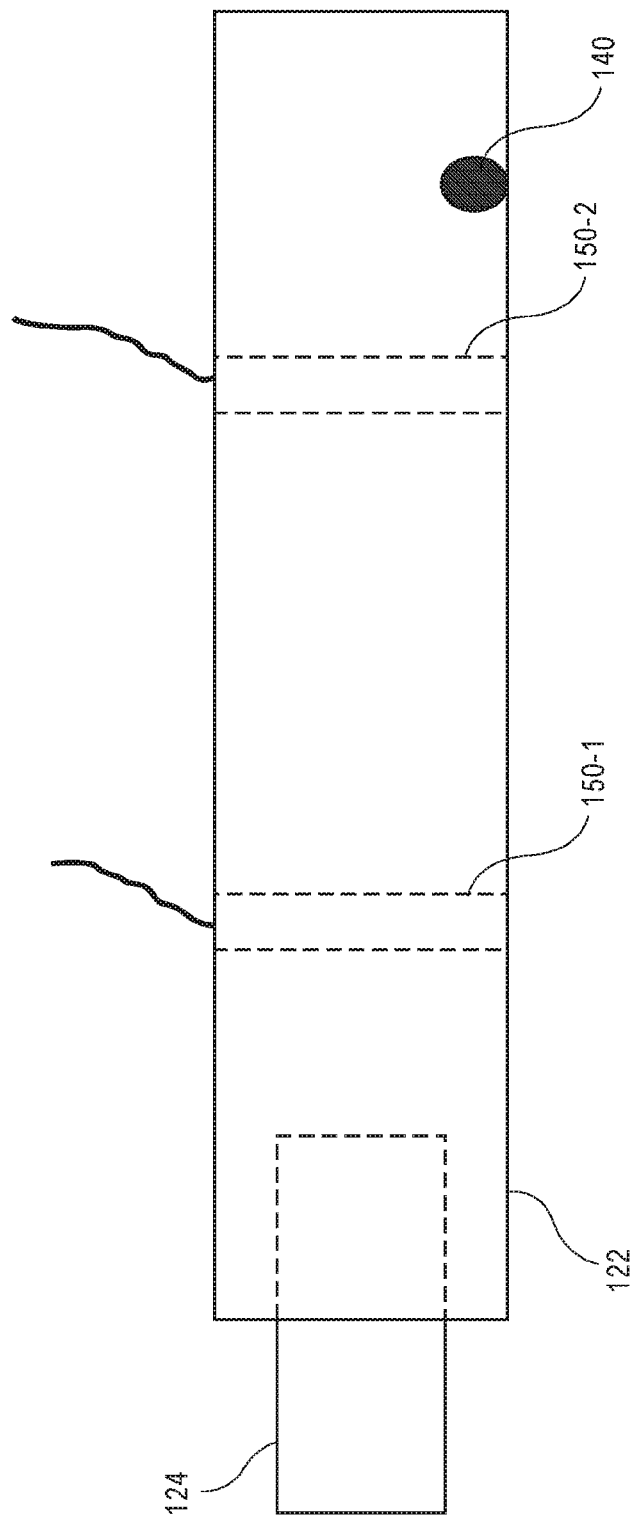
FIG. 3 illustrates a secondary product line having flow sensors according to one embodiment.

In another embodiment, which is illustrated in FIG. 3, there are a first particle sensor 150-1 and a second particle sensor 150-2 disposed serially within at least one secondary product line 122. First particle sensor 150-1 and second particle sensor 150-2 can be disposed individually or as parts within one unit. First particle sensor 150-1 and second particle sensor 150-2 are spaced at a distance such that a waveform measured at the first particle sensor 150-1 will be duplicated at the second particle sensor 150-2. As seeds travel through an air seeder, they will not flow in a uniform distribution all of the time. In a selected cross section, there can be one, two, three, four, five, or more seeds together. As the seeds travel over a distance, the distribution of seeds in each grouping can expand or condense. Over a short distance, the grouping will remain uniform. Each grouping of seeds will generate a different waveform in a particle sensor. The waveforms from a plurality of groupings will create a pattern in the first particle sensor 150-1. When this pattern is then detected at the second particle sensor 150-2, the time difference between each of these measurements is then divided by the distance between first particle sensor 150-1 and second particle sensor 150-2 to determine the speed of seeds/fertilizer in the secondary product line 122. Using the speed, electronic control system 300 can actuate actuator 128 to change the amount of air exiting tower 126 to change the speed of seed/fertilizer in the secondary product line 122.

An example of a particle sensor is Wavevision Sensor from Precision Planting LLC, and which is described in U.S. Pat. No. 6,208,255. First particle sensor 150-1 and second particle sensor 150-2 are in signal communication with electrical control system 300. This can provide a closed loop feedback control of valve 127.

While both the pressure sensor 140 and the particle sensors 150-1, 150-2 are illustrated, only one is needed for the closed loop feedback control.

Figure 7:
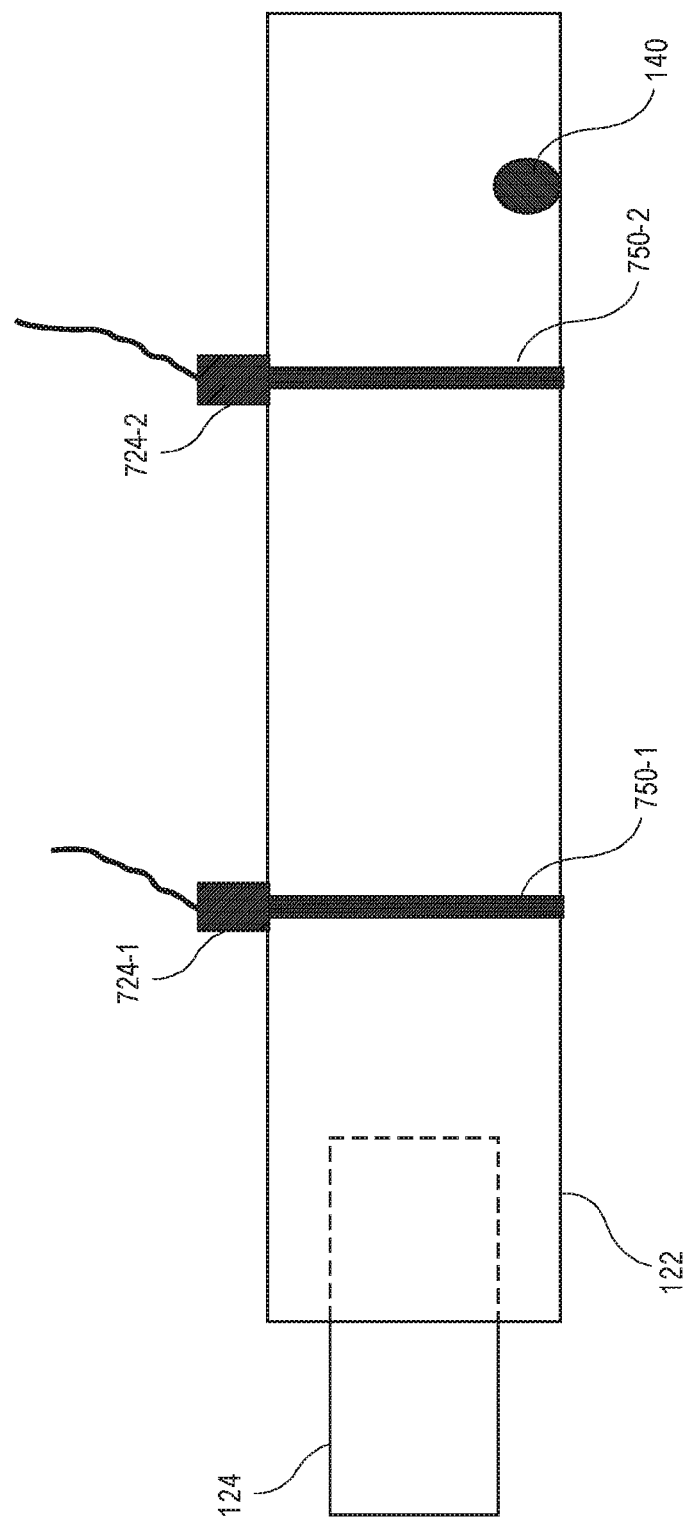
FIG. 7 illustrates a secondary product line 122 that contains at least one valve (e.g., 750-1, 750-2) and at least one corresponding actuator (e.g., 724-1, 724-2) in accordance with one embodiment.

In another embodiment that is illustrated in FIG. 2, there can be at least one valve (e.g., valve 160) disposed in each outlet 124 (or exit port) and actuated by actuator 161, which is in signal communication with electrical control system 300. Each actuator 161 (or actuators) can be individually controlled to further regulate flow with at least one valve in each secondary product line 122. Each secondary product line 122 can contain at least one valve (e.g., 750-1, 750-2) and corresponding actuator (e.g., 724-1, 724-2) as illustrated in FIG. 7. This can provide fine-tuned control in each secondary product line 122 separate from other secondary product lines 122. The pressure sensor 140, an ultrasonic speed sensor, or particle sensors 150-1, 150-2 in each secondary product line 122 can provide the measurement for controlling each actuator 122. In one embodiment, particle sensor 150-1, 150-2 can be any sensor with a signal output with a duration proportional to the time the sensor is blocked by particle(s) passing the sensor.

Figure 4:
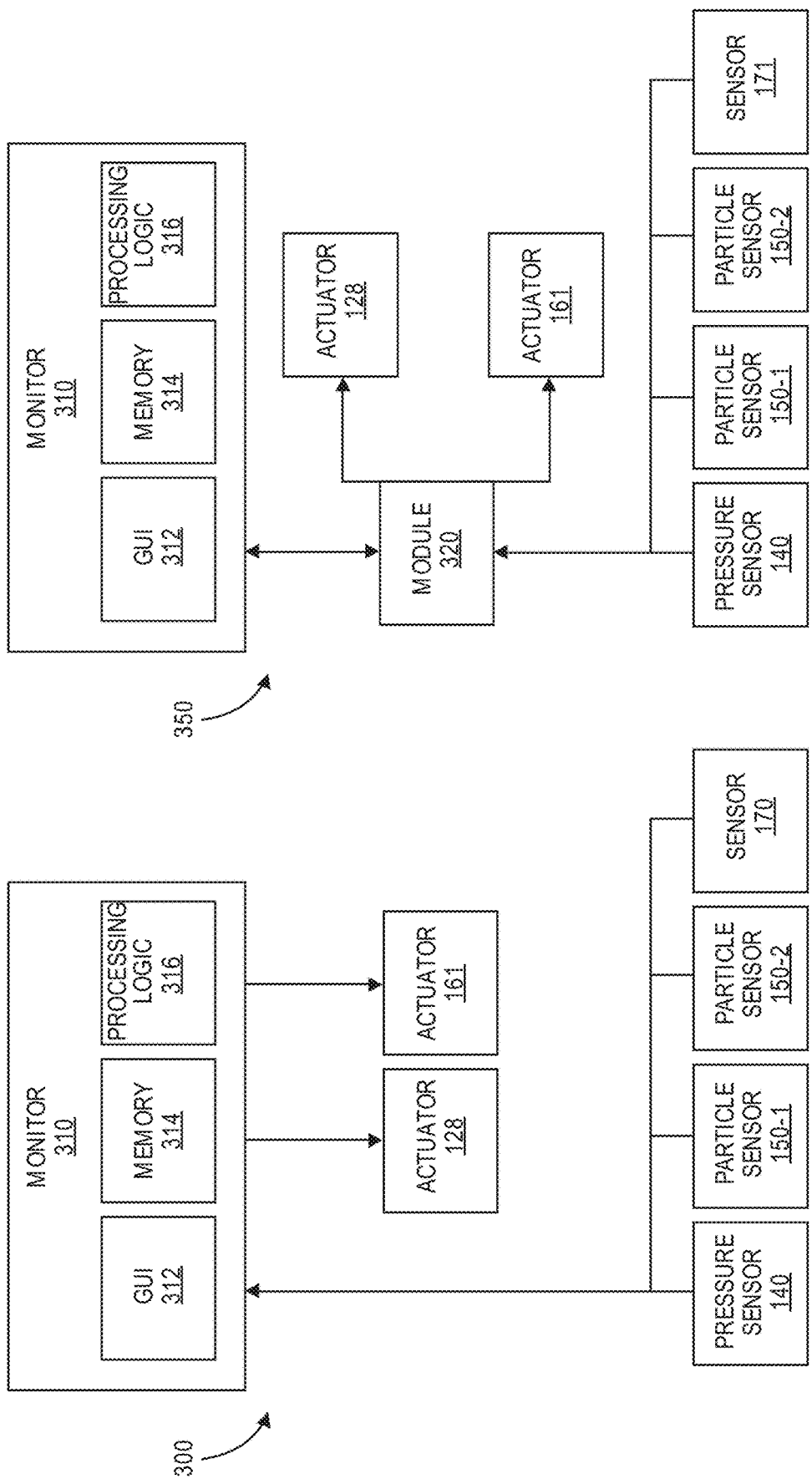
FIG. 4A schematically illustrates an embodiment of an electrical control system for controlling an actuator.
FIG. 4B schematically illustrates an embodiment of an electrical control system for controlling an actuator.

Electrical control system 300 is illustrated schematically in FIG. 4A in accordance with one embodiment. In the electrical control system 300, the monitor 310 is in signal communication with actuator 128, actuator 161, pressure sensor 140, fluid velocity sensor 170, and particle sensors 150-1, 150-2. It should be appreciated that the monitor 310 comprises an electrical controller. Monitor 310 includes processing logic 316 (e.g., a central processing unit (CPU) 316), a memory 314, and optionally a graphical user interface (GUI) 312, which allows a user to view and enter data into the monitor 310. The monitor 310 can be of a type disclosed in U.S. Pat. No. 8,386,137. For example, monitor 310 can be a planter monitor system that includes a visual display and user interface, preferably a touch screen graphic user interface (GUI). The touchscreen GUI is preferably supported within a housing which also houses a microprocessor, memory and other applicable hardware and software for receiving, storing, processing, communicating, displaying and performing various features and functions. The planter monitor system preferably cooperates and/or interfaces with various external devices and sensors.

An alternative electrical control system 350 is illustrated in FIG. 4B, which includes a module 320. Module 320 receives signals from pressure sensor 140, fluid velocity sensor 171, and particle sensors 150-1, 150-2, which can be provided to monitor 310 to output on GUI 312. Module 320 can also provide control signals to actuator 128 and actuator 161, which can be based on operator input into monitor 310.

In operation of the closed loop feedback control, monitor 310 receives a signal from the pressure sensor, fluid velocity sensor, and/or particle sensors 150-1, 150-2. The monitor 310 uses the pressure signal, fluid velocity signal, and/or the particle signal to set a selected position of actuator 128 to control valve 127 to regulate the amount of air leaving tower 126. Monitor 310 sends a signal to actuator 128 to effect this change. This in turn controls the amount of air flow in secondary product lines 122 to convey seeds/fertilizer to the trench with the appropriate force and/or speed to place the seeds/fertilizer in the trench without having the seeds/fertilizer bounce out of the trench.

In one example, the module 320 is located on an implement or on a tractor. The module 320 receives sensor data from the sensors that are located on an implement. The module processes the sensor data to perform operations of methods discussed herein or the module sends the sensor data to processing logic to perform operations of methods discussed herein.

In addition to measuring pressure or the velocity of the particle, the velocity of the fluid (air) can be measured. An ultrasonic speed sensor can measure fluid velocity.

Figure 5:
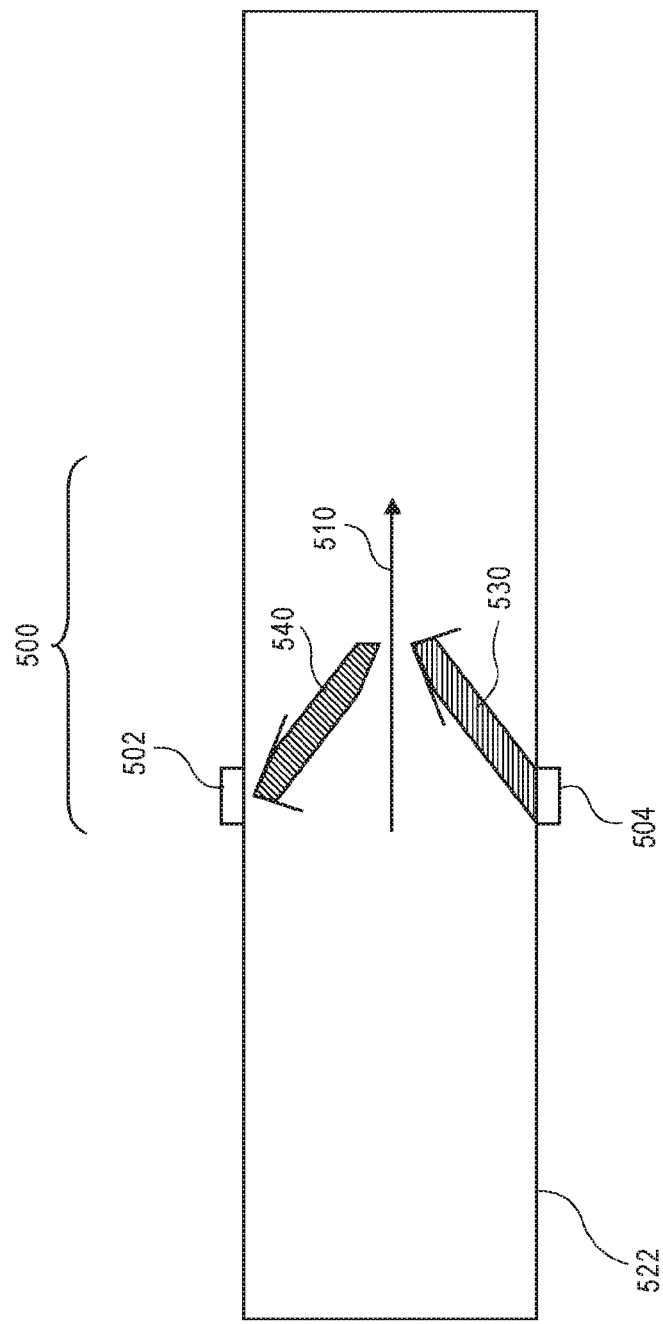
FIG. 5 illustrates a secondary product line having an ultrasonic sensor according to one embodiment.

FIG. 5 illustrates an ultrasonic sensor for detecting flow through a product line or pipe in accordance with one embodiment. The ultrasonic sensor 500 is positioned on a line 522 (e.g., secondary product line) or pipe 522 or in close proximity to the line 522 or pipe 522. The sensor (or ultrasonic flowmeter) uses acoustic waves or vibrations of a certain frequency (e.g., greater than 20 kHz, approximately 0.5 MHz). The sensor 500 uses either wetted or nonwetted transducers on the line or pipe perimeter to couple ultrasonic energy with the fluid flowing in the line or pipe. In one example, the sensor operates with the Doppler effect in which a transducer 504 having a transmitter transmits a beam 530. A transmitted frequency of the beam 530 is altered linearly by being reflected from particles and bubbles with a fluid that is within the line 522 to generate a Doppler reflection 540 that is received by a receiver of a transducer 502. A frequency shift between a frequency of the beam 530 and a frequency of the reflection 540 can be directly related to a flow rate of a fluid (e.g., liquid, air) having a flow direction 510. The frequency shift is linearly proportional to the rate of flow of materials in the line or pipe and can be used to generate an analog or digital signal that is proportional to flow rate of the fluid.

With an inside diameter (D) of a line 522 or pipe 522 being known, a volumetric flow rate (e.g., gallons per minute) equals K*Vf*$D_2$. In this example, Vf is flow velocity and K is a constant dependent on units of Vf and D.

Figure 6:
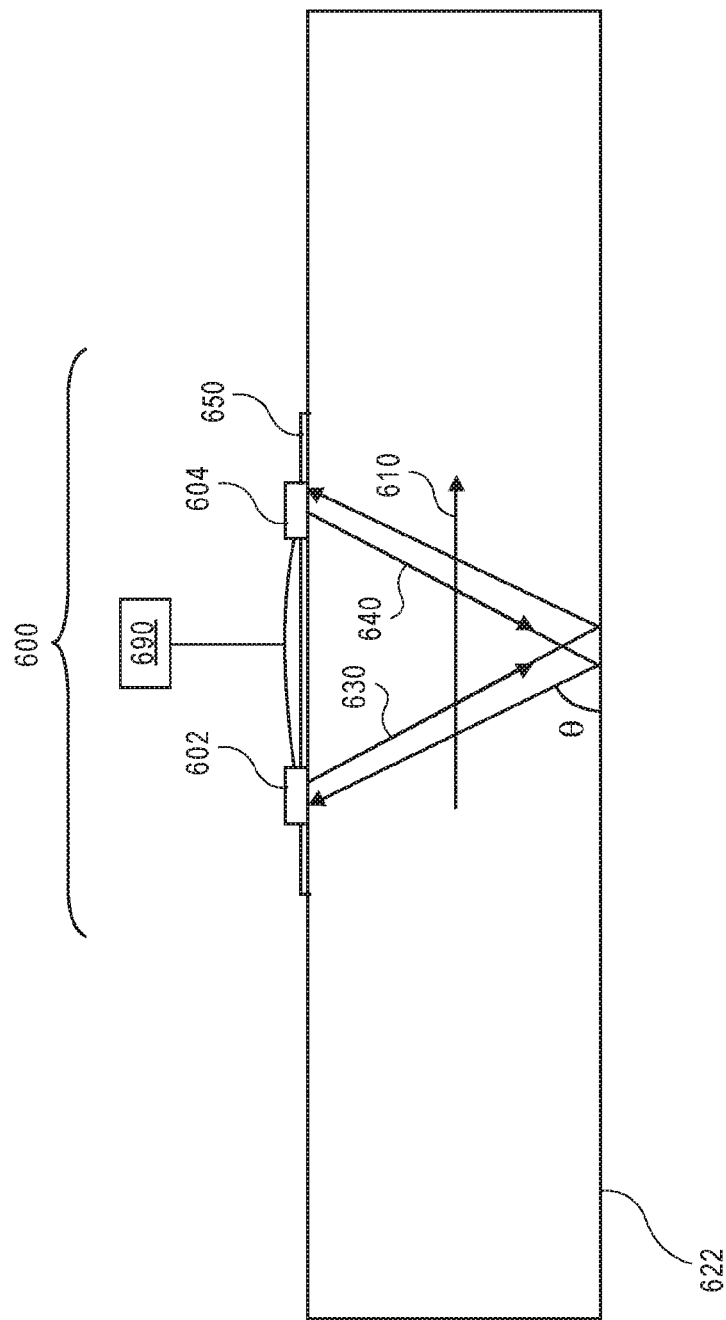
FIG. 6 illustrates a secondary product line having an ultrasonic sensor according to another embodiment.

FIG. 6 illustrates an ultrasonic sensor (e.g., transit-time flowmeter) for detecting flow through a product line or pipe in accordance with one embodiment. Transit-time flowmeters (e.g., time of flight flowmeter, time of travel flowmeter) measure a difference in travel time between pulses transmitted in a single path along and against a flow of fluid (e.g., liquid, air). The sensor 600 has a case 650 with transducers 602 and 604. The sensor 600 is positioned on a line 622 (e.g., secondary product line) or pipe 622 or in close proximity to the line 622 or pipe 522.

In one example as illustrated in FIG. 6, the sensor operates with transducers 602 and 604. Each transducer having a transmitter and a receiver alternately transmits and receives bursts of ultrasonic energy as beams 630 and 640 at an angle theta (e.g., approximately 45 degrees). A difference in transit times in upstream versus downstream directions (Tu−Td) measured over a same path can be used to calculate a flow through the line or pipe:

$$V = K*D/\sin 2\theta * 1/(T0-\tau)^2 \text{delta } T$$

V is a mean velocity of flowing fluid, K is a constant, D is a diameter of the line or pipe, theta is an incident angle of ultrasonic burst waves, T0 is zero flow transit time, delta T is T2−T1, T1 is transit time of burst waves (beam 630) from transducer 602 to transducer 604, T2 is transit time of burst waves (beam 640) from transducer 604 to transducer 602, and tau is transmit time of burst waves through the line 622 or pipe. The flow velocity is directly proportional to a measured different between upstream and downstream transit times. A measure of volumetric flow is determined by multiplying a cross-section area of the line or pipe with flow velocity. The volumetric flow can be determined with an optional micro-processor based converter 690 or the electrical control system 300 or 350. The fluid having a flow path 610 needs to be a reasonable conductor of sonic energy.

As previously discussed, seed or fertilizer sensors on agricultural equipment have typically been optical sensors. When a particle (seed or fertilizer) passes through the optical sensor a light beam is broken and a particle is then detected. The frequency of these particle detections can be used to determine planting populations if the frequency is low enough. However, for higher flow crops like wheat or fertilizer, typical optical sensors sizes of 25 mm or 32 mm do not have a large enough cross-sectional area to sense individual particles, therefore making the particle counts from these sensors unreliable and inaccurate. For this reason, optical sensors which will be used on implements experiencing these higher frequency rates (like air seeders) are called blockage sensors because these sensors can only report if they see particles or not.

Blockage sensors used on air seeds do not report enough seed pulses to report seeds/acre properly. Air seeders use a "seed distribution" metric that displays population without units. This can be an issue when the seeding rate too high, and the voltage pull down on the sensor wasn't happening as often, resulting in a lower population reported.

However, for a given sensor and particle type (e.g., corn, wheat, sorghum, barley, oats, canola, fertilizer, etc.), a relationship (as described below) can be measured between the time the optical sensor detects a particle and the actual particle frequency. If this relationship can be derived for certain particles, the measured duty cycle of the optical sensor can be used to calculate an estimated particle frequency, which than can used to calculate an estimated population based on other known variables like row speed, row spacing.

The duty cycle of a flow optical sensor can be used to calculate an estimated product or particle frequency, which than can used to calculate an estimated population based on other known variables like row speed or row spacing.

By knowing the duty cycle of the sensor, other mathematics can be done to generate useful metrics like "Relative Frequency" that a user (e.g., operator, farmer) can use to compare the number of particles going to each row on the implement and identify mechanical issues causing the row to row variation.

Figure 8:
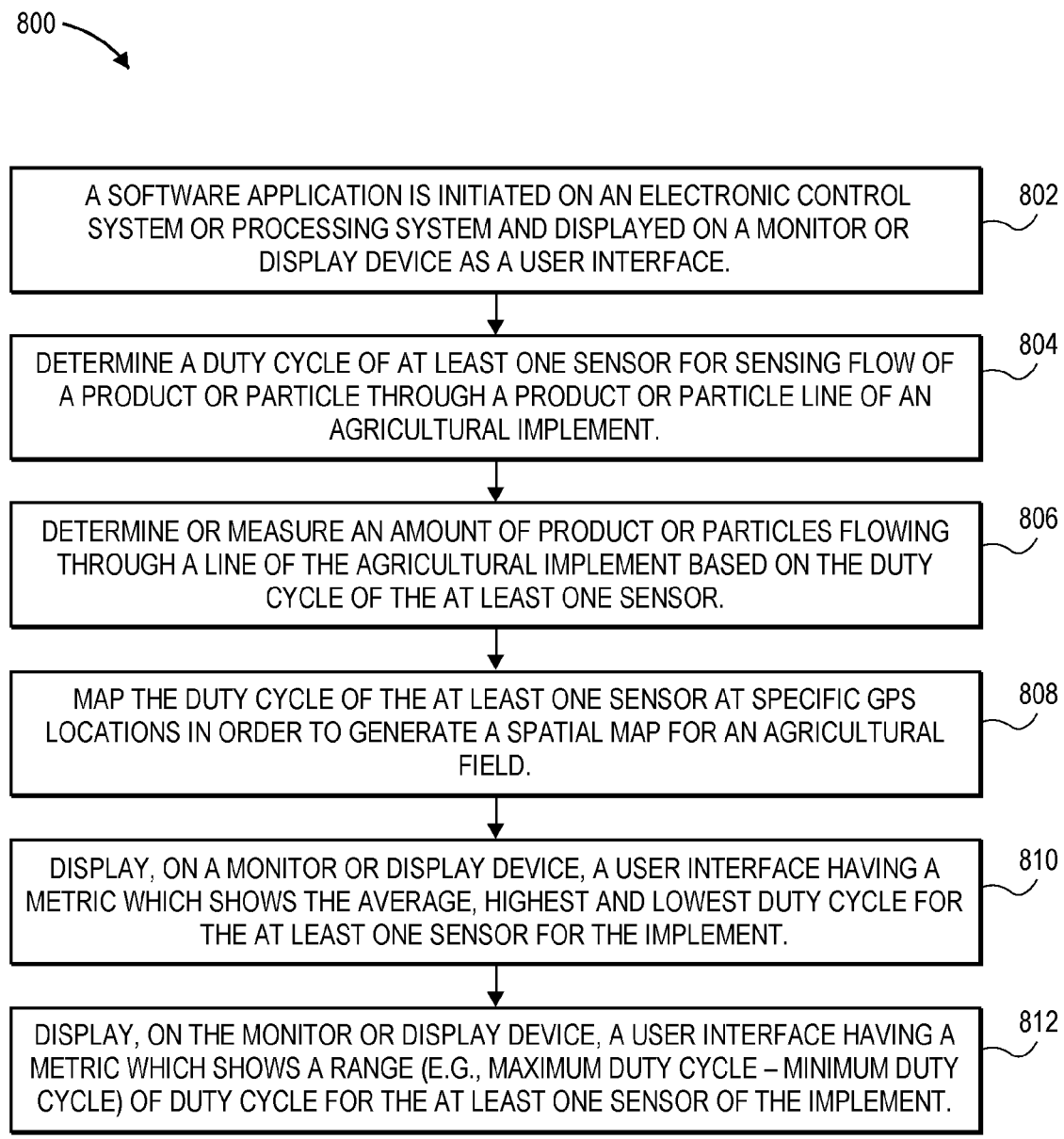
FIG. 8 illustrates a flow diagram of one embodiment for a method 800 of using duty cycle to determine particle and population metrics.

FIG. 8 illustrates a flow diagram of one embodiment for a method 800 of using duty cycle to determine particle and population metrics. The method 800 is performed by processing logic that may comprise hardware (circuitry, dedicated logic, etc.), software (such as is run on a general purpose computer system or a dedicated machine or a device), or a combination of both. In one embodiment, the method 800 is performed by processing logic (e.g., processing logic 316) of an electronic control system (e.g., electronic control system 300, electronic control system 350, machine, apparatus, monitor 310 having CPU 316, module 320, display device, user device, self-guided device, self-propelled device, etc). The electronic control system or processing system (e.g., processing system 1220, 1262) executes instructions of a software application or program with processing logic. The software application or program can be initiated by the electronic control system or processing system. In one example, a monitor or display device receives user input and provides a customized display for operations of the method 800.

At operation 802, a software application is initiated on an electronic control system or processing system and displayed on a monitor or display device as a user interface. The electronic control system or processing system may be integrated with or coupled to a machine that performs an application pass (e.g., planting, tillage, fertilization). Alternatively, the processing system may be integrated with an apparatus (e.g., drone, image capture device) associated with the machine that captures images during the application pass.

At operation 804, the method determines a duty cycle of at least one sensor (e.g., optical sensors, sensors 140, 150-1, 150-2, 171, transducers 502, 504, 602, 604) for sensing flow of a product or particle through a product or particle line of an agricultural implement. This line supplies the product or particle to an agricultural field.

At operation 806, the method measures an amount of product or particles flowing through a line of the agricultural implement based on the duty cycle of the at least one sensor. At operation 808, the method maps the duty cycle of the at least one sensor at specific GPS locations in order to generate a spatial map for an agricultural field.

At operation 810, a monitor or display device displays on a user interface a metric which shows the average, highest and lowest duty cycle for the at least one sensor for the implement. At operation 812, the monitor or display device displays on a user interface a metric which shows a range (e.g., maximum duty cycle-minimum duty cycle) of duty cycle for the at least one sensor of the implement.

Figure 9:
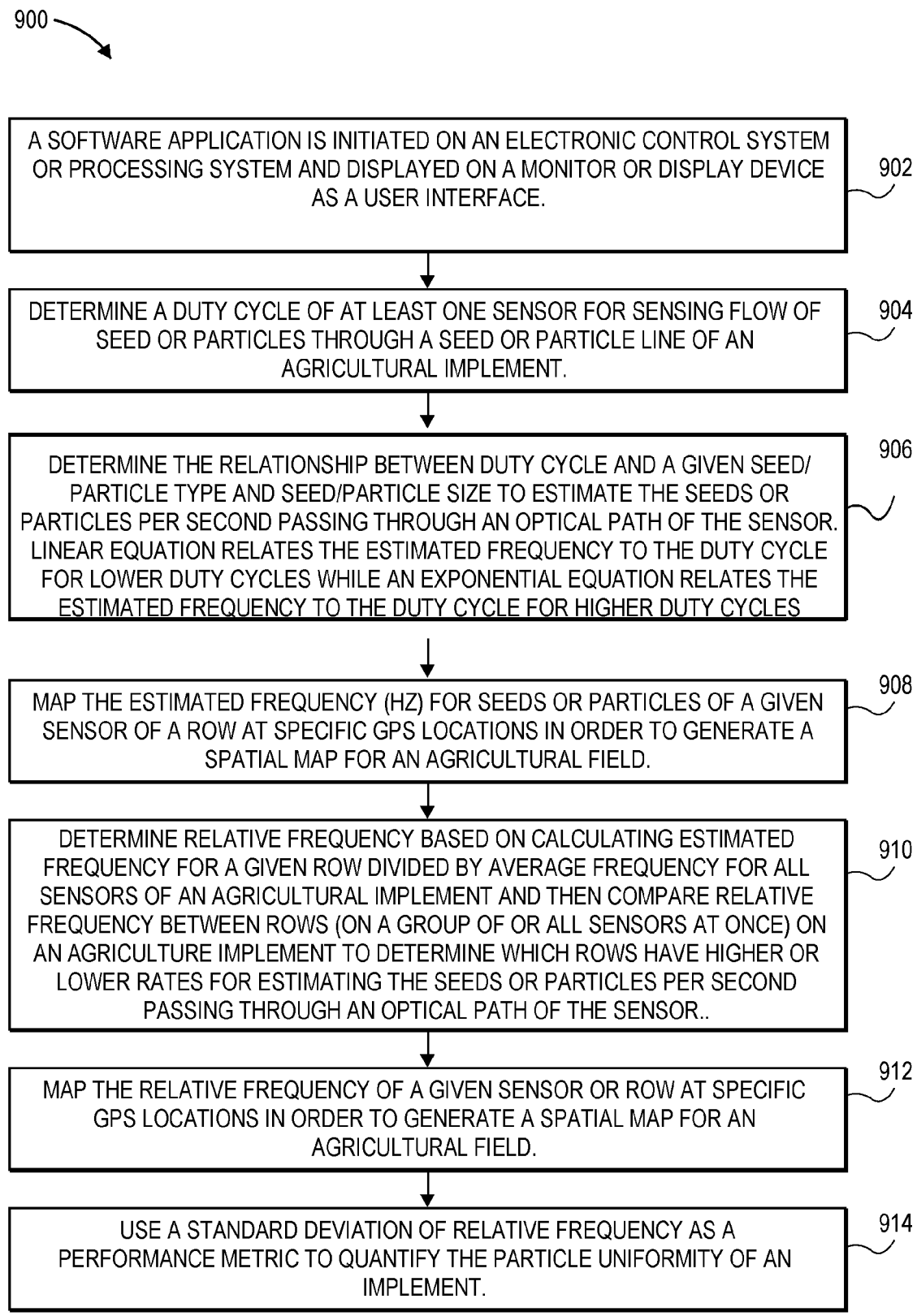
FIG. 9 illustrates a flow diagram of one embodiment for a method 900 of using duty cycle to estimate particle frequency metrics.

FIG. 9 illustrates a flow diagram of one embodiment for a method 900 of using duty cycle to estimate particle frequency metrics. The method 900 is performed by processing logic that may comprise hardware (circuitry, dedicated logic, etc.), software (such as is run on a general purpose computer system or a dedicated machine or a device), or a combination of both. In one embodiment, the method 900 is performed by processing logic (e.g., processing logic 316) of an electronic control system (e.g., electronic control system 300, electronic control system 350, machine, apparatus, monitor 310 having CPU 316, module 320, display device, user device, self-guided device, self-propelled device, etc). The electronic control system or processing system (e.g., processing system 1220, 1262) executes instructions of a software application or program with processing logic. The software application or program can be initiated by the electronic control system. In one example, a monitor or display device receives user input and provides a customized display for operations of the method 900.

At operation 902, a software application is initiated and displayed on a monitor or display device as a user interface. The electronic control system or processing system may be integrated with or coupled to a machine that performs an application pass (e.g., planting, tillage, fertilization). Alternatively, the electronic control system or processing system may be integrated with an apparatus (e.g., drone, image capture device) associated with the machine that captures images during the application pass.

At operation 904, the method determines a duty cycle of at least one sensor (e.g., optical sensors, sensors 140, 150-1, 150-2, 171, transducers 502, 504, 602, 604) for sensing flow of seed or particles through a seed or particle line of an agricultural implement. This line supplies the seed or particle to an agricultural field.

At operation 906, the method determines the relationship between duty cycle and a given seed or particle type and seed or particle size to estimate the seeds or particles per second passing through an optical path of the sensor. This estimated value of seeds or particles per second is referred to as Estimated Frequency (Hz). In one example, for lower duty cycles (e.g., 0-25%, 0-60% range), a linear equation relates the estimated frequency to the duty cycle. The linear equation follows below.

Y=m*x+b, with Y=estimated frequency for seeds or particles, m=constant between 1 and 10, x=duty cycle of at least one sensor, b=0.

In another example, for higher duty cycles (e.g., 25-100%, 60-100% range), an exponential equation relates the estimated frequency to the duty cycle. The exponential equation follows below.

Y=a*e^(bx), with Y=estimated frequency for seeds or particles, a=constant between 5 and 100, x=duty cycle of at least one sensor, b=constant between 0.01 and 10.

Figure 16:
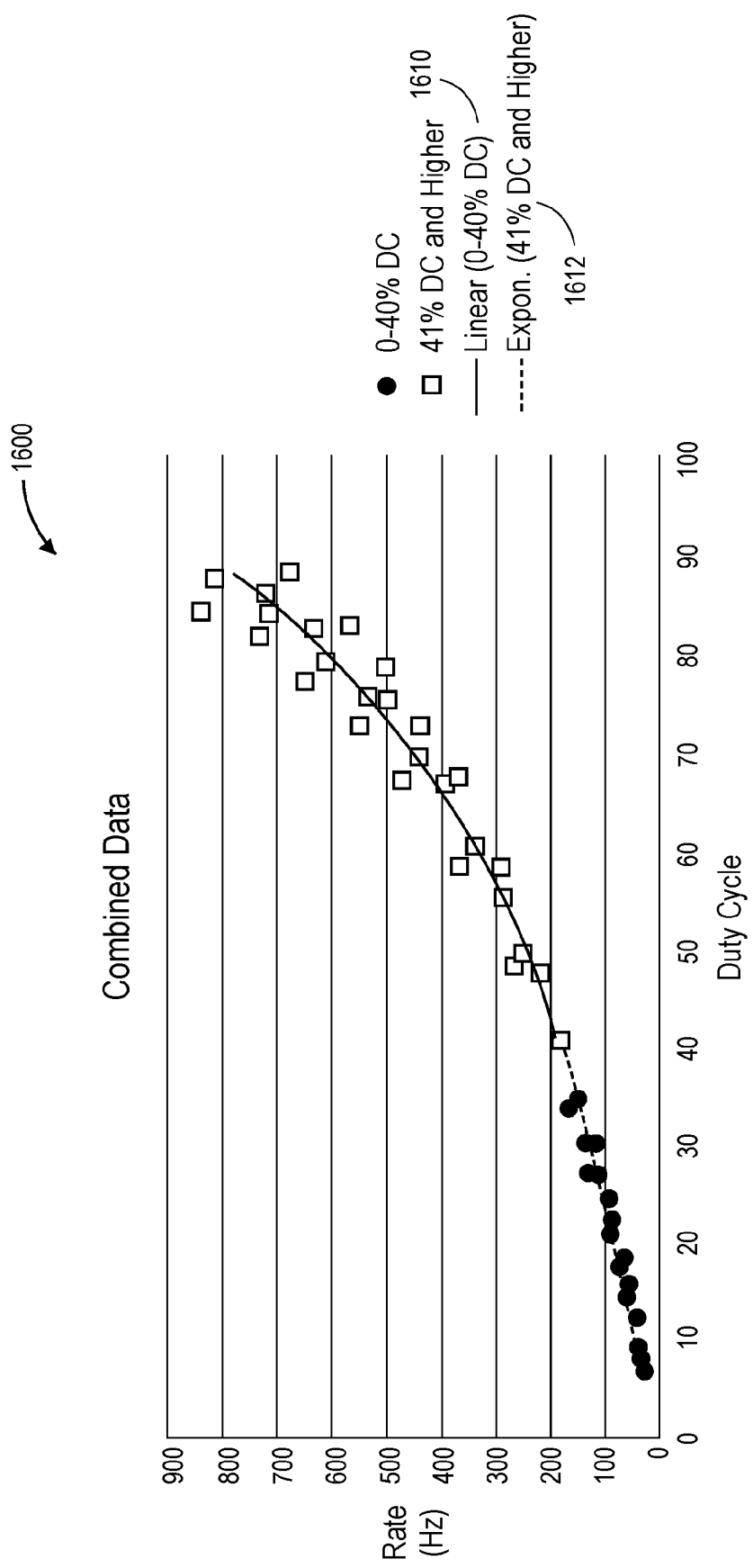
FIG. 16 illustrates a chart of estimated frequency versus duty cycle in accordance with one embodiment.

FIG. 16 illustrates a chart of estimated frequency versus duty cycle in accordance with one embodiment. A linear equation 1610 is used at lower duty cycles (0-50% or 0-25% duty cycle) and an exponential equation 1612 is used at higher duty cycles (50-100% duty cycles) to determine the estimated frequency based on the duty cycle. The switch from linear equation 1610 to exponential equation 1612 does not necessarily occur at a specific duty cycle. The transition can occur over a range from anywhere between 0 and 100% duty cycle. For example, a lower duty cycle could be 0-25% with the higher duty cycle being greater than 25% to 100% in one instance. In another embodiment, a non-linear equation can be used across the entire duty cycle range of 0-100%.

Returning to FIG. 9, at operation 908, the method maps the Estimated Frequency (Hz) for seeds or particles of a given sensor or row at specific GPS locations in order to generate a spatial map for an agricultural field.

At operation 910, the method determines relative frequency based on calculating estimated frequency for a given row divided by average frequency for all sensors of an agricultural implement and then compares relative frequency between rows (on a group of or all sensors at once) on an agriculture implement to determine which rows have higher or lower rates for estimating the seeds or particles per second passing through an optical path of the sensor.

At operation 912, the method maps the relative frequency of a given sensor or row at specific GPS locations in order to generate a spatial map for a given field.

At operation 914, the method uses a standard deviation of relative frequency as a performance metric to quantify the particle uniformity of an implement.

Figure 10:
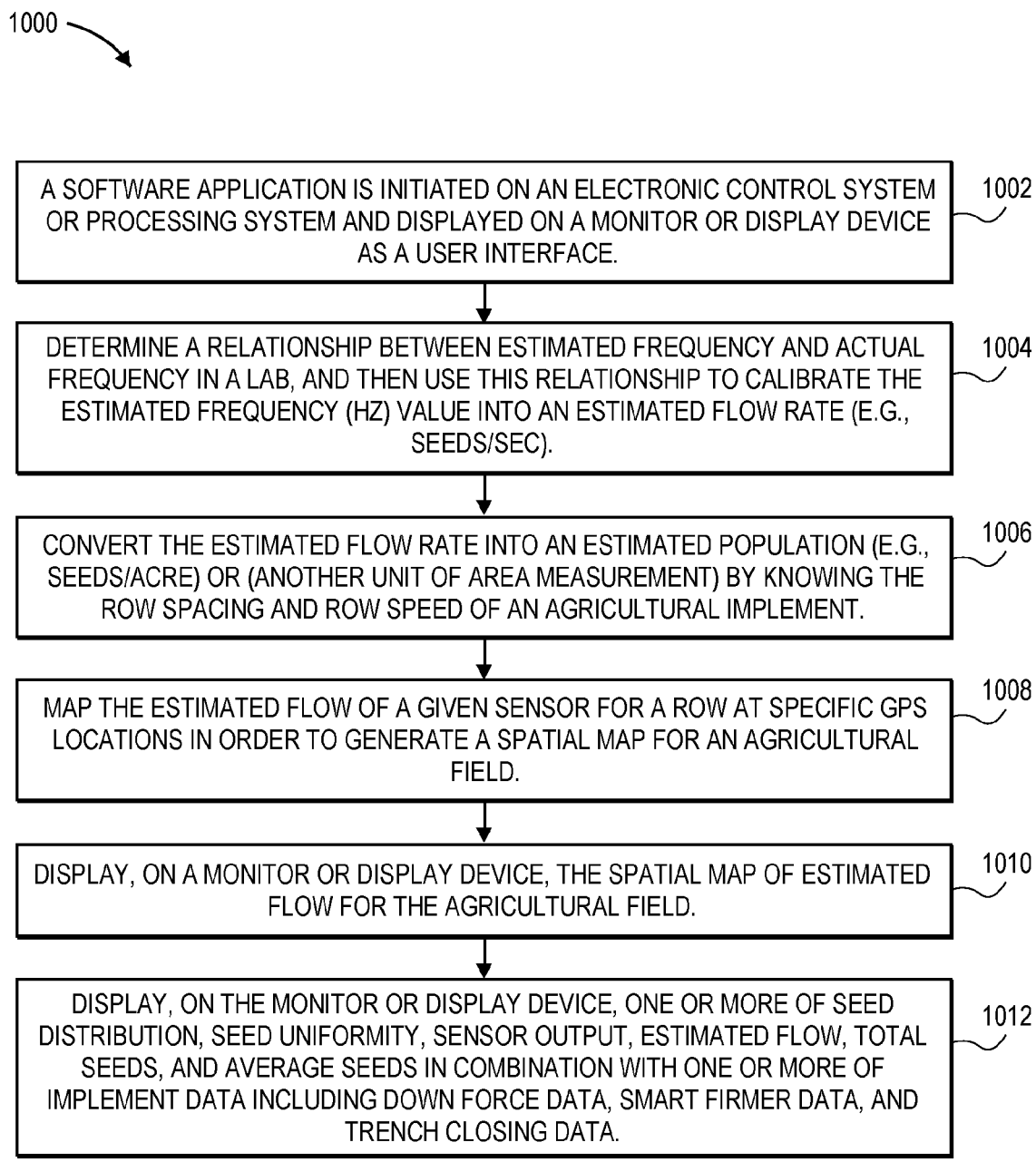
FIG. 10 illustrates a flow diagram of one embodiment for a method 1000 of using duty cycle to estimate particle frequency metrics.

FIG. 10 illustrates a flow diagram of one embodiment for a method 1000 of using duty cycle to estimate particle frequency metrics. The method 1000 is performed by processing logic that may comprise hardware (circuitry, dedicated logic, etc.), software (such as is run on a general purpose computer system or a dedicated machine or a device), or a combination of both. In one embodiment, the method 800 is performed by processing logic (e.g., processing logic 316) of an electronic control system (e.g., electronic control system 300, electronic control system 350, machine, apparatus, monitor 310 having CPU 316, module 320, display device, user device, self-guided device, self-propelled device, etc). The electronic control system or processing system (e.g., processing system 1220, 1262) executes instructions of a software application or program with processing logic. The software application or program can be initiated by the electronic control system or processing system. In one example, a monitor or display device receives user input and provides a customized display for operations of the method 1000.

At operation 1002, a software application is initiated on an electronic control system or processing system and displayed on a monitor or display device as a user interface. The processing system or electronic control system may be integrated with or coupled to a machine that performs an application pass (e.g., planting, tillage, fertilization). Alternatively, the processing system or electronic control system may be integrated with an apparatus (e.g., drone, image capture device) associated with the machine that captures images during the application pass.

At operation 1004, the method determines a relationship between estimated frequency and actual frequency in a lab, and then uses this relationship to calibrate the estimated frequency (Hz) value into an estimated flow rate (e.g., seeds/sec). At operation 1006, the method converts the estimated flow rate into an estimated population (e.g., seeds/acre or mass/acre (mass of each seed multiplied by the number of seeds)) or another unit of area measurement by knowing the row spacing and row speed of an agricultural implement. At operation 1008, the method maps the estimated flow of a given sensor for a row at specific GPS locations in order to generate a spatial map for an agricultural field. At operation 1010, the method displays on a monitor or display device the spatial map of estimated flow for the agricultural field. At operation 1012, the method displays on a monitor or display device one or more of seed distribution, seed uniformity, sensor output, estimated flow, total seeds, and average seeds in combination with one or more of implement data including down force data, soil testing implement data (such as, soil moisture data, organic matter data, soil temperature data), and trench closing data.

Figure 11:
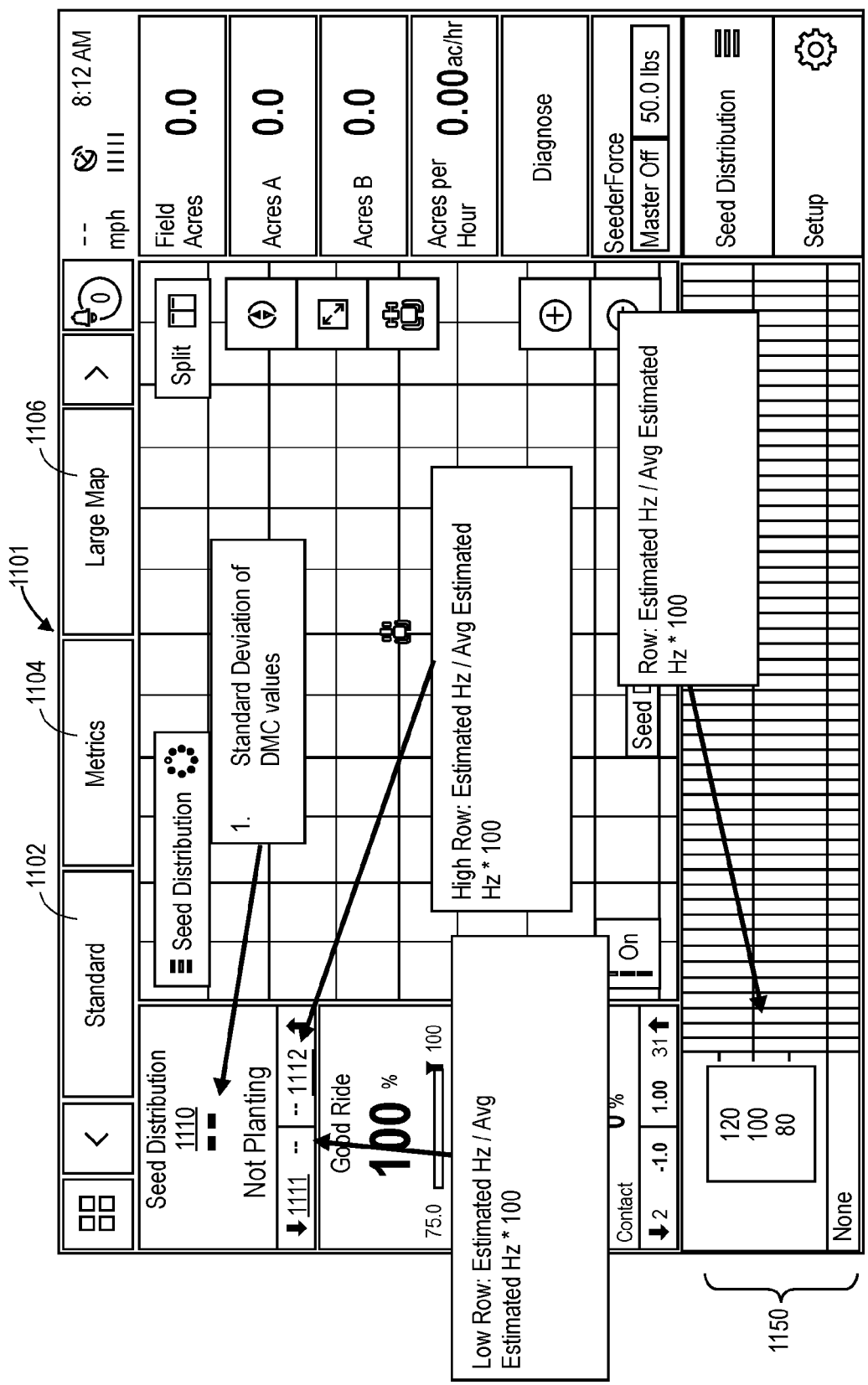
FIG. 11 illustrates a monitor or display device having a user interface 1101 with customized agricultural options including seed distribution in accordance with one embodiment.

FIG. 11 illustrates a monitor or display device having a user interface 1101 with customized agricultural options including seed distribution in accordance with one embodiment. An initiated software application (e.g., field application) of an electronic control system or a processing system generates the user interface 1101 that is displayed by the monitor or display device.

The software application can provide different display regions that are selectable by a user. In one example, the display regions include a standard option 1102, a metrics option 1104, and a large map option 1106 to control sizing of a displayed map in a field region. Also, in one example, the display regions include a seed uniformity region having selectable option 1110, low row region 1111, and a high row region 1112. The seed uniformity region displays a figure calculated from the standard deviation of dashboard minichart (DMC) values of DMC region 1150. The low row region 1111 displays a lowest estimate seed or particle frequency for a row unit divided by (average estimated seed or particle frequency*100 for all row units) of an agricultural implement. The high row region 1112 displays a highest estimate seed or particle frequency for a row unit divided by (average estimated seed or particle frequency*100 for all row units) of an agricultural implement.

The DMC region 1150 includes normalized values (e.g., 120, 100, 80) for seed or particle estimated frequency for a row unit/(average estimated frequency*100 for all row units). In one example, a middle value is set at 100.

Figure 12:
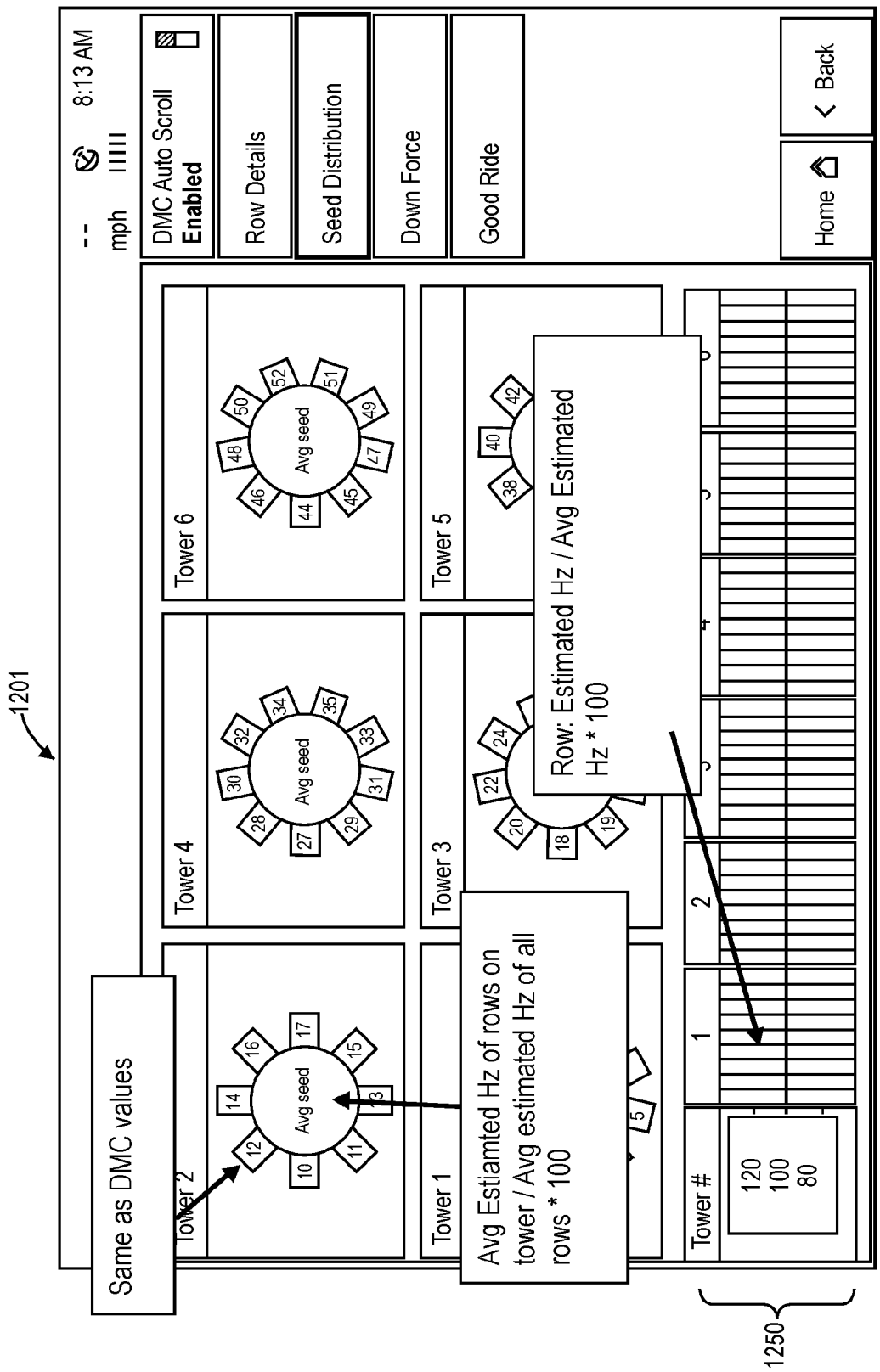
FIG. 12 illustrates a monitor or display device having a user interface 1201 with customized agricultural options including tower information for an agricultural implement in accordance with one embodiment.

FIG. 12 illustrates a monitor or display device having a user interface 1201 with customized agricultural options including tower information for an agricultural implement in accordance with one embodiment. An initiated software application (e.g., field application) of a processing system generates the user interface 1201 that is displayed by the monitor or display device.

The software application can provide different display regions that are selectable by a user. In one example, upon selection of seed distribution option 1110 from user interface 1101, the user interface 1201 having tower information is generated. The tower information for each tower includes selectable tower options having DMC values from region 1250 and average estimated seed or particle frequency of rows on a tower/(average estimated frequency of all rows*100 for a tower).

The DMC region 1250 includes normalized values (e.g., 120, 100, 80) for seed or particle estimated frequency for a row unit/(average estimated frequency*100 for all row units). In one example, a middle value is set at 100.

Figure 13:
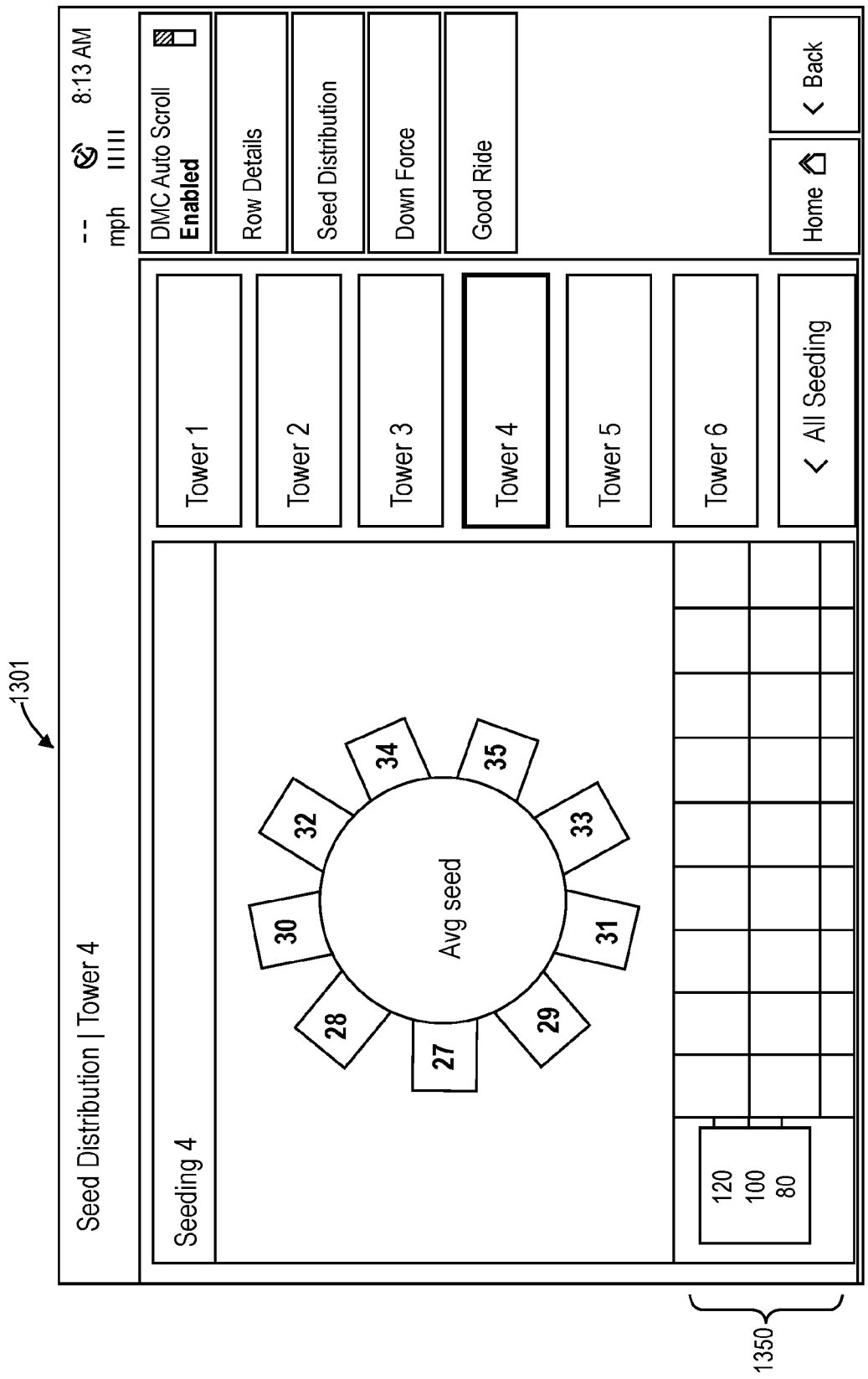
FIG. 13 illustrates a monitor or display device having a user interface 1301 with customized agricultural options including tower information for tower 4 for an agricultural implement in accordance with one embodiment.

Upon selection of a tower (e.g., tower 4), a user interface 1301 is generated as illustrated in FIG. 13. The user interface 1301 includes the same tower information for tower 4 that is illustrated in user interface 1201. The DMC region 1350 includes normalized values (e.g., 120, 100, 80) for seed or particle estimated frequency for a row unit/(average estimated frequency*100) for row units of tower 4. In one example, a middle value is set at 100.

Figure 14:
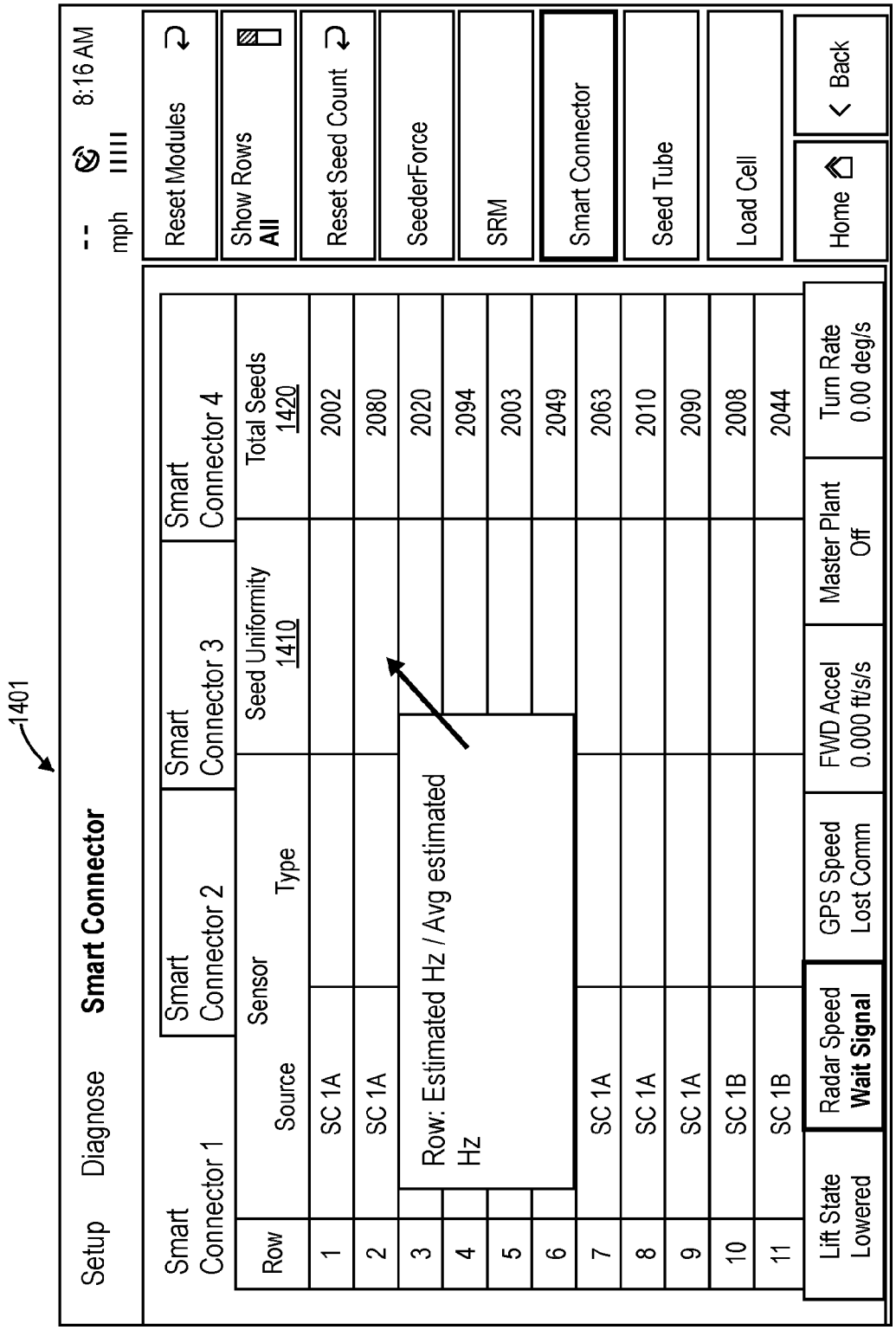
FIG. 14 illustrates a monitor or display device having a user interface 1401 with customized agricultural options including smart connector and seed uniformity information for an agricultural implement in accordance with one embodiment.

FIG. 14 illustrates a monitor or display device having a user interface 1401 with customized agricultural options including a seed data processing module, such as a Smart-Connector from Precision Planting LLC, and seed uniformity information for an agricultural implement in accordance with one embodiment. An initiated software application (e.g., field application) of an electronic control system or a processing system generates the user interface 1401 that is displayed by the monitor or display device.

The software application can provide different display regions that are selectable by a user. In one example, the display region of the user interface includes sensor information for sensing seed or particles passing through a seed or particle line on an agricultural implement, seed uniformity 1410, and total seeds 1420. The seed uniformity is calculated based on estimated frequency for seed or particles of a row unit (e.g., 1-11)/(average estimated frequency for seed or particles for all row units). Total seeds indicates a total number of seeds sensed by a sensor per unit time for a row unit.

Figure 15:
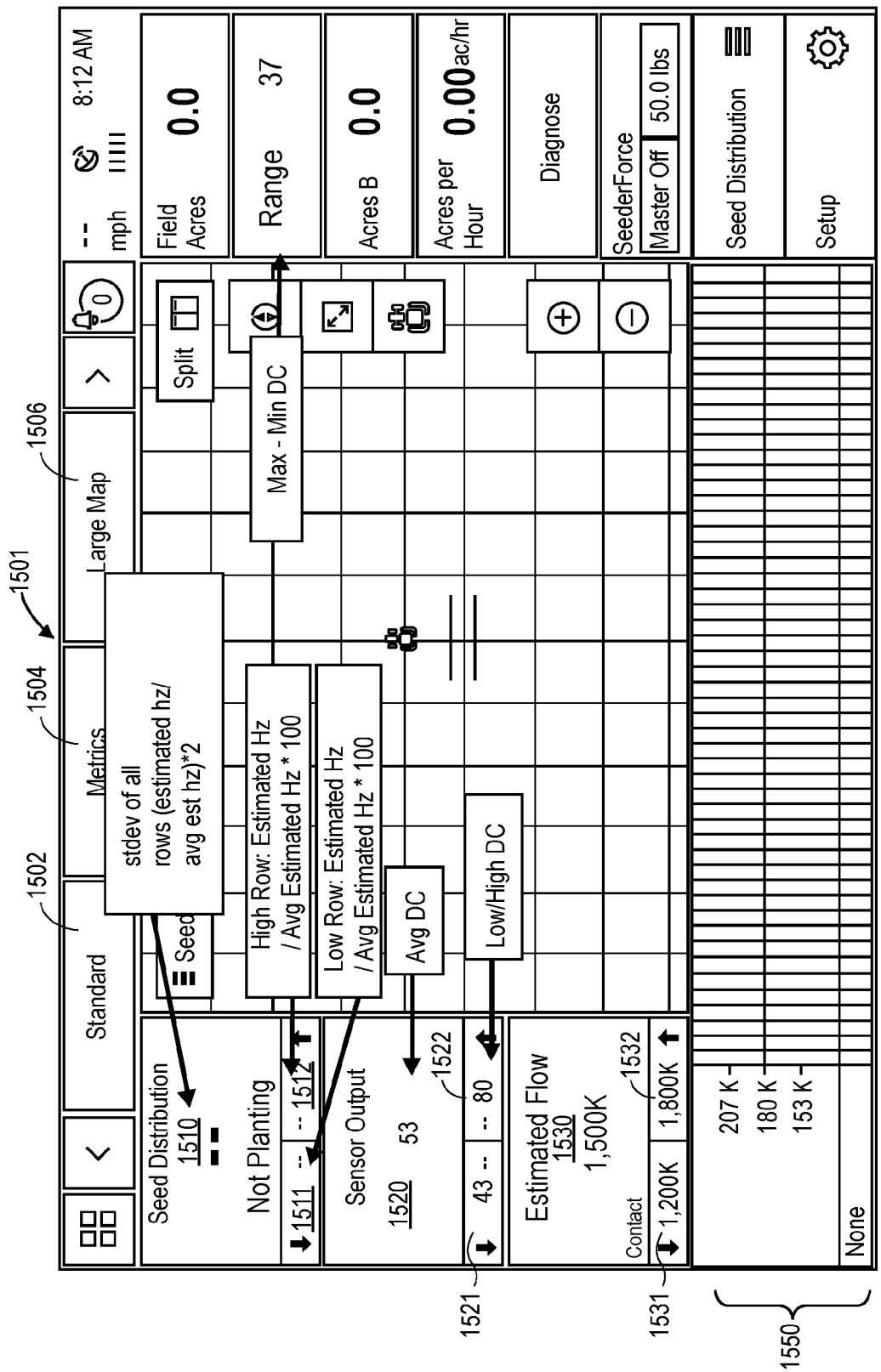
FIG. 15 illustrates a monitor or display device having a user interface 1501 with customized agricultural options including seed uniformity in accordance with one embodiment.

FIG. 15 illustrates a monitor or display device having a user interface 1501 with customized agricultural options including seed uniformity in accordance with one embodiment. An initiated software application (e.g., field application) of an electronic control system or a processing system generates the user interface 1501 that is displayed by the monitor or display device.

The software application can provide different display regions that are selectable by a user. In one example, the display regions include a standard option 1502, a metrics option 1504, and a large map option 1506 to control sizing of a displayed map in a field region. Also, in one example, the display regions include a seed uniformity region having selectable option 1510, low row region 1511, and a high row region 1512. The seed uniformity region 1510 displays a standard deviation of seed population for all rows (e.g., estimated seed or particle frequency for a row unit divided by (average estimated seed or particle frequency for all rows)*Constant). The dashboard minichart (DMC) region 1550 shows an estimated flow of 180,000 with half of the values being greater than 180,000 and half of the values being less than 180,000. The low row region 1511 displays a lowest seed uniformity of a row unit among all row units (e.g., estimated seed or particle frequency of a row unit divided by (average estimated seed or particle frequency*100 for all row unit)) of an agricultural implement. The high row region 1512 displays a highest seed uniformity for all rows (e.g., estimated seed or particle frequency of a row unit divided by (average estimated seed or particle frequency*100 for all row unit)) of an agricultural implement. A sensor output region 1520 displays an average duty cycle for sensors of the row units, low sensor output 1521 with a lowest sensor duty cycle, and high sensor output 1522 with a highest sensor duty cycle. In one example, a sensor has a first voltage level and a second voltage level. The duty cycle is calculated based on a percentage of time that the sensor operates at the first voltage level (e.g., less than 1 volt). The sensor switches from a first voltage level to a second voltage level or vice versa based on sensing a seed or particle that passes through an optical path of the sensor.

The estimated flow region 1530 displays an estimated seed population with a lowest estimated flow 1531 and highest estimated population 1532. Duty cycle of the seed or particle sensors are used to calculate an estimate frequency then estimated frequency is used to calculate a flow number.

In one embodiment, an estimated particle frequency of the sensor can calculated based on one or more properties chosen from measured duty cycle, particle type, particle size, and particle shape. In another embodiment, the estimated particle frequency can be estimated based on an empirically determined look-up table or fitted equation of the frequency to duty cycle relationship. In another embodiment, the estimated particle frequency can be estimated based on an individual calibration constant determined via a calibration procedure or a calibrated flow benchmark. In another embodiment, an estimated particle frequency to duty cycle calibration curve can be self learned over time by the control system. As more data is collected, the calibration curve can be adjusted based on the data. In another embodiment, a duty cycle to estimated particle frequency relationship can initially use a fixed relationship based on nominal empirical data and particle properties and then change to a corrected relationship based on measured (or self learned) data.

The monitor or display device can also display any of the parameters or metrics discussed herein (e.g., seed distribution, seed uniformity, sensor output, estimated flow, total seeds, average seeds, population) in combination with one or more of implement data including down force data, soil testing implement data (such as soil moisture data, organic matter data, soil temperature data), and trench closing data.

Exemplary metrics include high row, low row, and average (for any value) metrics, population (including the commanded population rate and the actual population rate), singulation, skips, multiples, smooth ride (good ride), good spacing, downforce, ground contact, speed, and vacuum. FIGS. 5 and 6 in U.S. Pat. Nos. 8,078,367, 9,955,625, and 6,070,539, which are incorporated by reference herein, provides examples of some of these same metrics. U.S. Pat. Nos. 8,078,367 and 9,955,625 are incorporated by reference herein.

Examples of soil testing implement data can be found in WO2019070617A1, which is incorporated by reference herein. FIGS. 20, 22, 45, 48, 50, 51, 52, 71, and 72 provide examples of the soil testing implement data (e.g., soil apparatus data) including organic matter, soil moisture, temperature, depth, soil components, good spacing, seed germination moisture, voids, uniformity of moisture, moisture variability, emergence environment score, seed environment score, and seed environment score properties. An example of the implement is the SmartFirmer sensor from Precision Planting LLC.

Examples of closing information can be found in International patent WO2017197274, PCT/US2018/061388, filed on Nov. 15, 2018, and International patent PCT/US2019/020452, filed ono Mar. 2, 2019, which are incorporated by reference herein.

Figure 17:
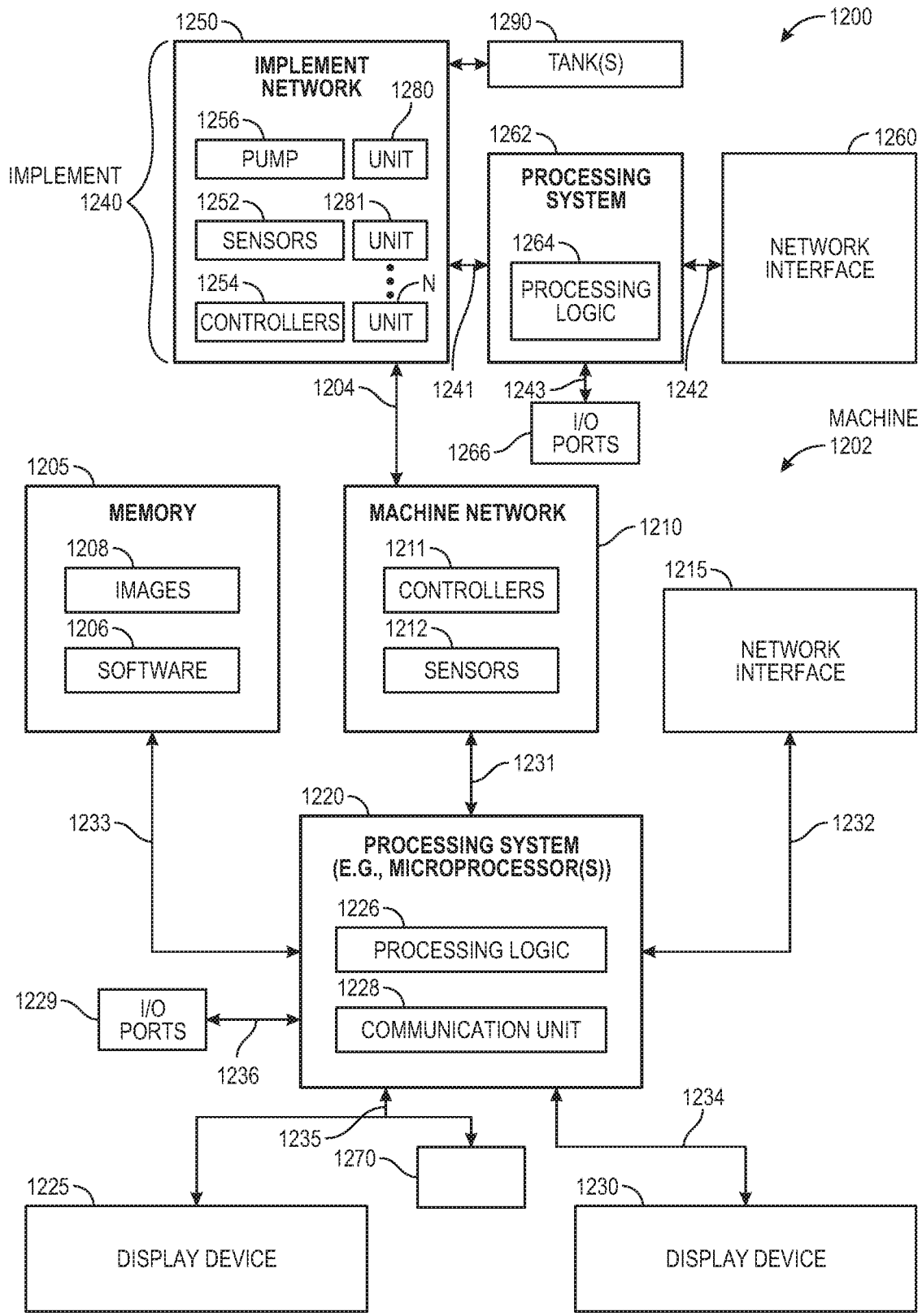
FIG. 17 shows an example of a system 1200 that includes a machine 1202 (e.g., tractor, combine harvester, etc.) and an implement 1240 (e.g., planter, sidedress bar, cultivator, plough, sprayer, spreader, irrigation implement, etc.) in accordance with one embodiment.

FIG. 17 shows an example of a system 1200 that includes a machine 1202 (e.g., tractor, combine harvester, etc.) and an implement 1240 (e.g., planter, sidedress bar, cultivator, plough, sprayer, spreader, irrigation implement, etc.) in accordance with one embodiment. The machine 1202 includes a processing system 1220, memory 1205, machine network 1210 (e.g., a controller area network (CAN) serial bus protocol network, an ISOBUS network, etc.), and a network interface 1215 for communicating with other systems or devices including the implement 1240. The machine network 1210 includes sensors 1212 (e.g., speed sensors, optical sensors), controllers 1211 (e.g., GPS receiver, radar unit) for controlling and monitoring operations of the machine or implement. The network interface 1215 can include at least one of a GPS transceiver, a WLAN transceiver (e.g., WiFi), an infrared transceiver, a Bluetooth transceiver, Ethernet, or other interfaces from communications with other devices and systems including the implement 1240. The network interface 1215 may be integrated with the machine network 1210 or separate from the machine network 1210 as illustrated in FIG. 12. The I/O ports 1229 (e.g., diagnostic/on board diagnostic (OBD) port) enable communication with another data processing system or device (e.g., display devices, sensors, etc.).

In one example, the machine performs operations of a tractor that is coupled to an implement for planting applications and seed or particle sensing during an application. The planting data and seed/particle data for each row unit of the implement can be associated with locational data at time of application to have a better understanding of the planting and seed/particle characteristics for each row and region of a field. Data associated with the planting applications and seed/particle characteristics can be displayed on at least one of the display devices 1225 and 1230. The display devices can be integrated with other components (e.g., processing system 1220, memory 1205, etc.) to form the monitor 300.

The processing system 1220 may include one or more microprocessors, processors, a system on a chip (integrated circuit), or one or more microcontrollers. The processing system includes processing logic 1226 for executing software instructions of one or more programs and a communication unit 1228 (e.g., transmitter, transceiver) for transmitting and receiving communications from the machine via machine network 1210 or network interface 1215 or implement via implement network 1250 or network interface 1260. The communication unit 1228 may be integrated with the processing system or separate from the processing system. In one embodiment, the communication unit 1228 is in data communication with the machine network 1210 and implement network 1250 via a diagnostic/OBD port of the I/O ports 1229.

Processing logic 1226 including one or more processors or processing units may process the communications received from the communication unit 1228 including agricultural data (e.g., GPS data, planting application data, soil characteristics, any data sensed from sensors of the implement 1240 and machine 1202, etc.). The system 1200 includes memory 1205 for storing data and programs for execution (software 1206) by the processing system. The memory 1205 can store, for example, software components such as planting application software or seed/particle software for analysis of seed/particle and planting applications for performing operations of the present disclosure, or any other software application or module, images (e.g., captured images of crops, seed, soil, furrow, soil clods, row units, etc.), alerts, maps, etc. The memory 1205 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1220 communicates bi-directionally with memory 1205, machine network 1210, network interface 1215, header 1280, display device 1230, display device 1225, and I/O ports 1229 via communication links 1231-1236, respectively. The processing system 1220 can be integrated with the memory 1205 or separate from the memory 1205.

Display devices 1225 and 1230 can provide visual user interfaces for a user or operator. The display devices may include display controllers. In one embodiment, the display device 1225 is a portable tablet device or computing device with a touchscreen that displays data (e.g., planting application data, captured images, localized view map layer, high definition field maps of different measured seed/particle data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 1230 may be a display (e.g., display provided by an original equipment manufacturer (OEM)) that displays images and data for a localized view map layer, measured seed/particle data, as-applied fluid application data, as-planted or as-harvested data, yield data, seed germination data, seed environment data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 1270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 1240 (e.g., planter, cultivator, plough, sprayer, spreader, irrigation implement, etc.) includes an implement network 1250, a processing system 1262, a network interface 1260, and optional input/output ports 1266 for communicating with other systems or devices including the machine 1202. The implement network 1250 (e.g., a controller area network (CAN) serial bus protocol network, an ISOBUS network, etc.) includes a pump 1256 for pumping fluid from a storage tank(s) 1290 to application units 1280, 1281, . . . N of the implement, sensors 1252 (e.g., radar, electroconductivity, electromagnetic, a force probe, speed sensors, seed/particle sensors for detecting passage of seed/particle, sensors for detecting characteristics of soil or a trench including a plurality of soil layers differing by density, a depth of a transition from a first soil layer to a second soil layer based on density of each layer, a magnitude of a density layer difference between soil layers, a rate of change of soil density across a depth of soil, soil density variability, soil surface roughness, residue mat thickness, a density at a soil layer, soil temperature, seed presence, seed spacing, percentage of seeds firmed, and soil residue presence, at least one optical sensor to sense at least one of soil organic matter, soil moisture, soil texture, and soil cation-exchange capacity (CEC), downforce sensors, actuator valves, moisture sensors or flow sensors for a combine, speed sensors for the machine, seed force sensors for a planter, fluid application sensors for a sprayer, or vacuum, lift, lower sensors for an implement, flow sensors, etc.), controllers 1254 (e.g., GPS receiver), and the processing system 1262 for controlling and monitoring operations of the implement. The pump controls and monitors the application of the fluid to crops or soil as applied by the implement. The fluid application can be applied at any stage of crop development including within a planting trench upon planting of seeds, adjacent to a planting trench in a separate trench, or in a region that is nearby to the planting region (e.g., between rows of corn or soybeans) having seeds or crop growth.

For example, the controllers may include processors in communication with a plurality of seed sensors. The processors are configured to process data (e.g., fluid application data, seed sensor data, soil data, furrow or trench data) and transmit processed data to the processing system 1262 or 1220. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 1260 can be a GPS transceiver, a WLAN transceiver (e.g., WiFi), an infrared transceiver, a Bluetooth transceiver, Ethernet, or other interfaces from communications with other devices and systems including the machine 1202. The network interface 1260 may be integrated with the implement network 1250 or separate from the implement network 1250 as illustrated in FIG. 24.

The processing system 1262 communicates bi-directionally with the implement network 1250, network interface 1260, and I/O ports 1266 via communication links 1241-1243, respectively.

The implement communicates with the machine via wired and possibly also wireless bi-directional communications 1204. The implement network 1250 may communicate directly with the machine network 1210 or via the network interfaces 1215 and 1260. The implement may also by physically coupled to the machine for agricultural operations (e.g., seed/particle sensing, planting, harvesting, spraying, etc.).

The memory 1205 may be a machine-accessible non-transitory medium on which is stored one or more sets of instructions (e.g., software 1206) embodying any one or more of the methodologies or functions described herein. The software 1206 may also reside, completely or at least partially, within the memory 1205 and/or within the processing system 1220 during execution thereof by the system 1200, the memory and the processing system also constituting machine-accessible storage media. The software 1206 may further be transmitted or received over a network via the network interface 1215.

In one embodiment, a machine-accessible non-transitory medium (e.g., memory 1205) contains executable computer program instructions which when executed by a data processing system cause the system to perform operations or methods of the present disclosure. While the machine-accessible non-transitory medium (e.g., memory 1205) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

What is claimed is:

1. An electronic system comprising:
  a display device to display data;
  at least one sensor that is configured to switch from a first voltage level to a second voltage level based on sensing a seed or particle that passes through an optical path of the at least one sensor; and processing logic coupled to the display device, the processing logic including one or more processors is configured to determine a duty cycle of the at least one sensor for sensing flow of a seed or particle through a seed or particle line of an agricultural implement and to determine an amount of seeds or particles flowing through the seed or particle line of the agricultural implement based on the duty cycle of the at least one sensor, wherein the processing logic is configured to calculate the duty cycle of the least one sensor based on a percentage of time that the at least one sensor operates at the first voltage level.

2. The electronic system of claim 1, wherein the processing logic is configured to map the duty cycle of the at least one sensor at different GPS locations in order to generate a spatial map for an agricultural field.

3. The electronic system of claim 1, wherein the processing logic is configured to map the duty cycle difference between each seed or particle sensor of the at least one sensor of each row unit with respect to an average duty cycle or a median duty cycle at different GPS locations for seed or particle sensors of all row units of the agricultural implement in order to generate a spatial map for an agricultural field.

4. The electronic system of claim 1, wherein the display device to display on a user interface a metric which shows the average, highest and lowest duty cycle for seed or particle sensors of the at least one sensor for all row units of the agricultural implement.

5. The electronic system of claim 4, wherein the display device displays on the user interface a metric which shows a range of duty cycles between seed or particle sensors of the at least one sensor for all row units of the agricultural implement.

6. The electronic system of claim 5, wherein the display device displays on the user interface one or more of one or more of implement data including down force data, soil data, and trench closing data.

7. The electronic system of claim 1, wherein the display device to display on a user interface a metric which shows a duty cycle difference between each seed or particle sensor of the at least one sensor of each row unit with respect to an average duty cycle or a median duty cycle for seed or particle sensors of all row units of the agricultural implement.

8. The electronic system of claim 1, wherein an estimated particle frequency of the at least one sensor is calculated based on one or more properties chosen from measured duty cycle, particle type, particle size, and particle shape.

9. The electronic system of claim 8 wherein the estimated particle frequency is estimated based on an empirically determined look-up table or fitted equation of the frequency to duty cycle relationship.

10. The electronic system of claim 8 wherein the estimated particle frequency is estimated based on an individual calibration constant determined via a calibration procedure or a calibrated flow benchmark.

11. The electronic system of claim 8 wherein an estimated particle frequency to duty cycle calibration curve is self learned over time by the control system.

12. The electronic system of claim 8, wherein initially a duty cycle to estimated particle frequency relationship uses a fixed relationship based on nominal empirical data and particle properties and then changes to a corrected relationship based on measured data.

13. The electronic system of claim 8, wherein the estimated product or particle frequency is used to calculate an estimated product or particle population based on known variables including row speed and row spacing for rows within the agricultural field.

14. An electrical system comprising:
at least one sensor for sensing flow of seeds or particles within a flow line of an agricultural implement;
a module to receive sensor data from the at least sensor; and
the electronic system of claim 1
wherein the processing logic is coupled to the module, and
the processing logic is configured to determine a relationship between duty cycle and a given seed or particle type and seed or particle size to estimate a frequency of seeds or particles passing through an optical path of the at least one sensor.

15. The electrical system of claim 14, wherein the estimated frequency of seeds or particles per second is based on a linear equation for a first range of duty cycles.

16. The electrical system of claim 15, wherein the estimated frequency of seeds or particles per second is based on an exponential equation for a second range of duty cycles with the second range being higher than the first range.

17. The electrical system of claim 14, wherein the processing logic is configured to map the estimated frequency of seeds or particles of the at least one sensor at GPS locations in order to generate a spatial map for an agricultural field.

18. The electrical system of claim 17, wherein the processing logic is configured to map the relative frequency of a given sensor at different GPS locations in order to generate the spatial map for the agricultural field.

19. The electrical system of claim 14, wherein the processing logic is configured to determine relative frequency based on calculating estimated frequency for a row unit divided by average frequency for sensors of all row units of an agricultural implement and to compare relative frequency between rows units on the agriculture implement.

20. The electrical system of claim 19, wherein the processing logic is configured to use a standard deviation of relative frequency to determine a performance metric to quantify a seed or particle uniformity of the agricultural implement.

21. The electrical system of claim 14, wherein the at least one sensor comprises an optical sensor.

22. The electrical system of claim 14, wherein the at least one sensor is disposed in a primary supply line of an air seeder tower or disposed in at least one secondary supply line for the air seeder tower.

23. A computer implemented method for estimating flow of seeds for at least one sensor, the computer implemented method comprising:
determining a duty cycle of at least one sensor for sensing flow of a seed or particle line through a seed or particle line of an agricultural implement; and
determining an amount of seed or particles flowing through the seed on particle line of the agricultural implement based on the duty cycle of the at least one sensor;
wherein the at least one sensor switches from a first voltage level to a second voltage level based on sensing a seed or particle that passes through an optical path of the at least one sensor, the method comprising calculating the duty cycle based on a percentage of time that the at least one sensor operates at the first voltage level.

24. The computer implemented method of claim 23, the method further comprising:
  determining a relationship between an estimated frequency and an actual frequency for flow of seeds for the at least sensor of the agricultural implement, and
  using this relationship to calibrate the estimated frequency (Hz) into an estimated flow rate for the seed, and
  converting the estimated flow rate into an estimated population in terms of seeds per acre or another unit of area measurement by knowing row spacing and row speed of the agricultural implement.

25. The computer implemented method of claim 24, the method further comprising:
  mapping the estimated flow of the at least one sensor for a row at GPS locations in order to generate a spatial map for the agricultural field.

26. The computer implemented method of claim 25, the method further comprising:
  displaying on a monitor or display device the spatial map of estimated flow for the agricultural field.

27. The computer implemented method of claim 26, the method further comprising:
  displaying on the monitor or display device one or more of seed distribution, seed uniformity, sensor output, estimated flow, total seeds, and average seeds in combination with one or more of implement data including down force data, soil apparatus data, and trench closing data.

* * * * *